(12) United States Patent
Miyata et al.

(10) Patent No.: US 7,995,132 B2
(45) Date of Patent: Aug. 9, 2011

(54) IMAGE SENSING APPARATUS, IMAGE SENSING METHOD, AND RECORDING MEDIUM WHICH RECORDS PHOTOGRAPHING METHOD

(75) Inventors: Akira Miyata, Kodaira (JP); Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 413 days.

(21) Appl. No.: 12/336,918

(22) Filed: Dec. 17, 2008

(65) Prior Publication Data

US 2009/0102962 A1   Apr. 23, 2009

Related U.S. Application Data

(62) Division of application No. 10/910,763, filed on Aug. 2, 2004, now abandoned.

(30) Foreign Application Priority Data

Aug. 4, 2003   (JP) .................................. 2003-285925
Mar. 4, 2004   (JP) .................................. 2004-060990

(51) Int. Cl.
H04N 5/232   (2006.01)
H04N 5/235   (2006.01)
G03B 13/00   (2006.01)
G03B 7/00   (2006.01)
G03B 17/00   (2006.01)

(52) U.S. Cl. ............ 348/345; 348/362; 396/76; 396/237

(58) Field of Classification Search .................. 348/345, 348/349, 357, 362; 396/76, 77, 79, 90, 103, 396/137, 237
See application file for complete search history.

(56) References Cited

U.S. PATENT DOCUMENTS

| | | | |
|---|---|---|---|
| 4,985,723 A | * | 1/1991 | Egawa et al. .................. 396/133 |
| 5,748,998 A | | 5/1998 | Ishiguro et al. |
| 5,751,354 A | | 5/1998 | Suzuki et al. |

(Continued)

FOREIGN PATENT DOCUMENTS

JP   59-62810 A   4/1984

(Continued)

OTHER PUBLICATIONS

Japanese Office Action dated Jul. 6, 2010, and English translation thereof, issued in Japanese Patent Application No. 2007-241711, which claims domestic priority of counterpart Japanese Patent Application No. 2004-060990.

*Primary Examiner* — John M Villecco
(74) *Attorney, Agent, or Firm* — Holtz, Holtz, Goodman & Chick PC

(57) ABSTRACT

Photographing at a fixed focus is executed by quickly canceling the autofocus without any labor for mode switching or the like. An image sensing apparatus includes a photographing unit which has an autofocus function and photographs an object image, a key input unit including a shutter key which has two operation strokes and designates autofocus and autoexposure by operation of the first stroke and photographing by operation of the second stroke, and a focus control unit which automatically sets a correct exposure value in the photographing unit, detects predetermined operation states of the first and second strokes designated by the shutter key, and switches and selects, on the basis of the detection result, whether to operate the autofocus function or set a fixed-focus position at which a predetermined depth of field is obtained.

7 Claims, 12 Drawing Sheets

U.S. PATENT DOCUMENTS

| | | | |
|---|---|---|---|
| 5,815,745 A * | 9/1998 | Ohsawa | 396/76 |
| 6,184,931 B1 | 2/2001 | Kaneda | |
| 6,493,828 B1 | 12/2002 | Yamaguchi et al. | |
| 6,549,729 B1 | 4/2003 | Robins et al. | |
| 6,833,863 B1 | 12/2004 | Clemens | |
| 7,129,984 B1 | 10/2006 | Okada et al. | |
| 7,233,357 B1 | 6/2007 | Ohkubo | |
| 7,634,186 B2 * | 12/2009 | Nojima | 396/103 |
| 7,719,602 B2 * | 5/2010 | Aoyama et al. | 348/345 |
| 7,738,784 B2 * | 6/2010 | Nakai et al. | 396/263 |
| 2002/0027601 A1 | 3/2002 | Nakayama et al. | |
| 2003/0117503 A1 | 6/2003 | Miyashita | |
| 2003/0142228 A1 | 7/2003 | Flach et al. | |
| 2005/0041136 A1 * | 2/2005 | Miyata et al. | 348/345 |
| 2005/0275742 A1 * | 12/2005 | Baron | 348/345 |
| 2009/0141141 A1 * | 6/2009 | Onozawa | 348/222.1 |
| 2009/0196592 A1 * | 8/2009 | Nojima | 396/103 |
| 2010/0128146 A1 * | 5/2010 | Nojima | 348/231.99 |

FOREIGN PATENT DOCUMENTS

| | | | |
|---|---|---|---|
| JP | 63-301928 A | | 12/1988 |
| JP | 3-35229 A | | 2/1991 |
| JP | 5-45575 A | | 2/1993 |
| JP | 5-161101 A | | 6/1993 |
| JP | 6-67256 A | | 3/1994 |
| JP | 6-222259 A | | 8/1994 |
| JP | 6-258569 A | | 9/1994 |
| JP | 7-56227 A | | 3/1995 |
| JP | 2002-090823 A | | 3/2002 |
| JP | 2003-101853 A | | 4/2003 |
| JP | 2003-140025 A | | 5/2003 |
| JP | 2003-186077 A | | 7/2003 |
| JP | 2003-274267 | | 9/2003 |
| JP | 2003262786 A | * | 9/2003 |
| JP | 2004-23205 A | | 1/2004 |
| JP | 2004-38063 A | | 2/2004 |

* cited by examiner

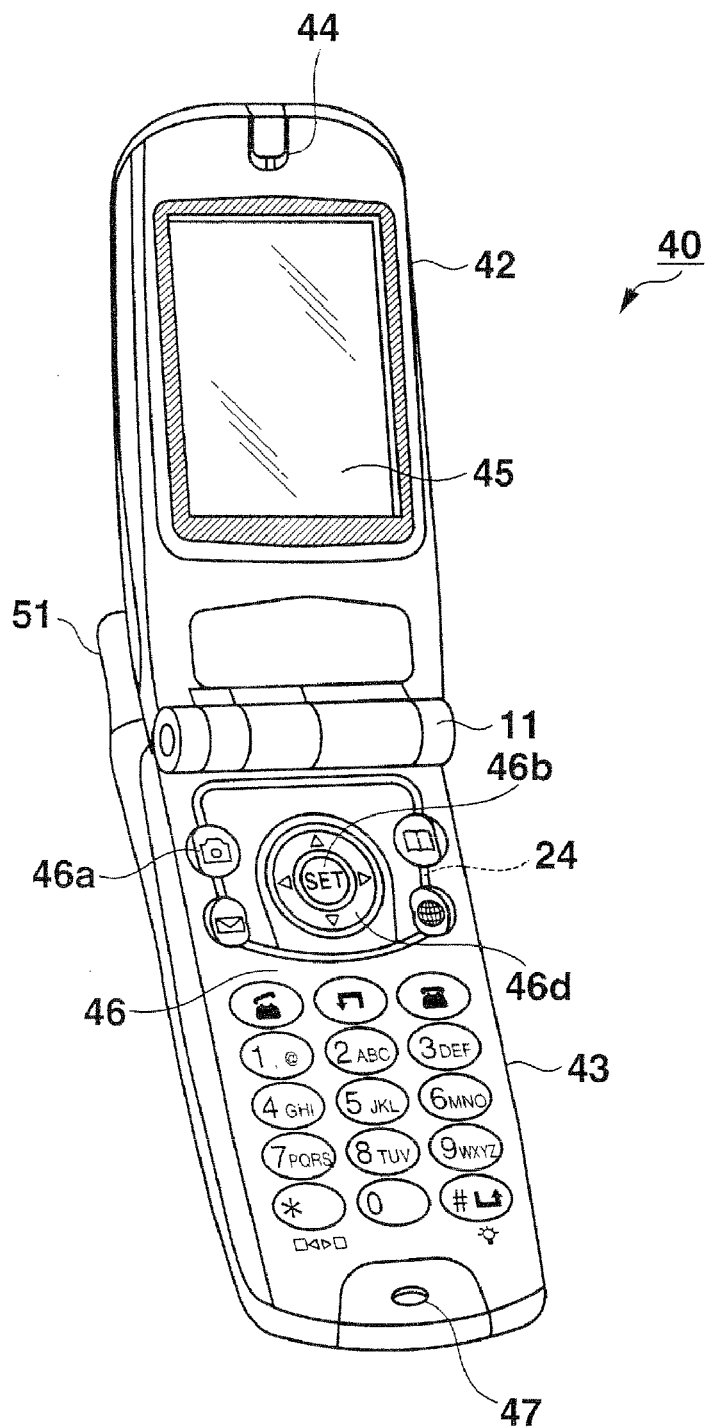
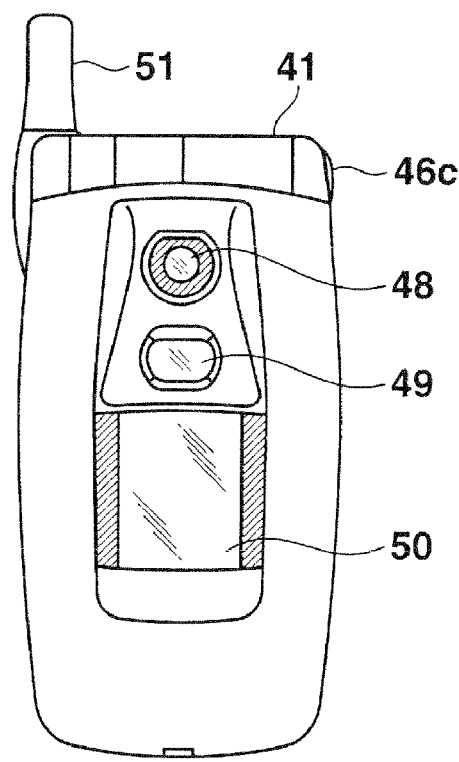
FIG.9A  FIG.9B

IMAGE SENSING APPARATUS, IMAGE SENSING METHOD, AND RECORDING MEDIUM WHICH RECORDS PHOTOGRAPHING METHOD

CROSS-REFERENCE TO RELATED APPLICATIONS

The present application is a Divisional Application of U.S. application Ser. No. 10/910,763 filed Aug. 2, 2004 now abandoned, which is based upon and claims the benefit of priority from prior Japanese Patent Applications No. 2003-285925, filed Aug. 4, 2003; and No. 2004-060990, filed Mar. 4, 2004, the entire contents of which are incorporated herein by reference.

BACKGROUND OF THE INVENTION

1. Field of the Invention

The present invention relates to an image sensing apparatus and image sensing method suitable for a digital still camera, a cellular phone with a camera function, and the like, and a recording medium which records a photographing method.

2. Description of the Related Art

Conventionally, a camera with an autofocus (AF) function executes photographing at a fixed focus having a predetermined depth of field without using the AF function in order to take a snapshot or to quickly perform photographing without any failure in a situation in which it is difficult to focus the lens by the AF function (see, e.g., patent reference 1).

Patent Reference 1

Jpn. Pat. Appln. KOKAI Publication No. 2002-090823

In patent reference 1, the autofocus mode and fixed-focus mode must be arbitrarily selected by mode switching. Quick photographing is impossible in the fixed-focus mode immediately after switching from a state in which the autofocus mode is selected. The user may miss a good photo opportunity.

BRIEF SUMMARY OF THE INVENTION

An image sensing apparatus according to the present invention is characterized by comprising a photographing unit which has an autofocus function and photographs an object image, an autoexposure unit which automatically sets a correct exposure value in the photographing unit, a designation unit which has two operation strokes and designates autofocus and autoexposure by an operation of a first stroke and photographing by an operation of a second stroke, a detection unit which detects predetermined operation states of the first stroke and the second stroke designated by the designation unit, and a focus control unit which switches and selects, on the basis of a detection result of the detection unit, whether to operate the autofocus function or set a fixed-focus position at which a predetermined depth of field is obtained.

An image sensing apparatus according to the present invention is characterized by comprising a photographing unit which has an autofocus function and photographs an object image, an autoexposure unit which automatically sets a correct exposure value in the photographing unit, an exposure comparison unit which compares the correct exposure value obtained by the autoexposure unit with a preset exposure value, and a focus control unit which switches and selects, on the basis of a comparison result of the exposure comparison unit, whether to operate the autofocus function or set a fixed-focus position at which a predetermined depth of field is obtained.

An image sensing apparatus according to the present invention is characterized by comprising a photographing unit which photographs an object image and has a multifocal length switching function of switching between at least a plurality of focal lengths and an autofocus function, a focal length comparison unit which compares a current focal length of the photographing unit with a preset focal length, and a focus control unit which switches and selects, on the basis of a comparison result of the focal length comparison unit, whether to operate the autofocus function or set a fixed-focus position at which a predetermined depth of field is obtained.

An image sensing apparatus according to the present invention is characterized by comprising a photographing unit which has an autofocus function and photographs an object image, an autoexposure unit which automatically sets a correct exposure value in the photographing unit, an exposure setting unit which sets an arbitrary exposure value instead of the correct exposure value automatically set by the autoexposure unit, an exposure detection unit which detects the exposure value when the exposure setting unit sets the exposure value, and a focus control unit which switches and selects, on the basis of a detection result of the exposure detection unit, whether to operate the autofocus function or set a fixed-focus position at which a predetermined depth of field is obtained.

BRIEF DESCRIPTION OF THE SEVERAL VIEWS OF THE DRAWING

FIGS. 9A and 9B are views showing the outer appearance of a cellular phone according to the fourth embodiment of the present invention;

DETAILED DESCRIPTION OF THE INVENTION

First Embodiment

The first embodiment in which the present invention is applied to a digital still camera will be described with reference to the several views of the accompanying drawing.

Figure 1:
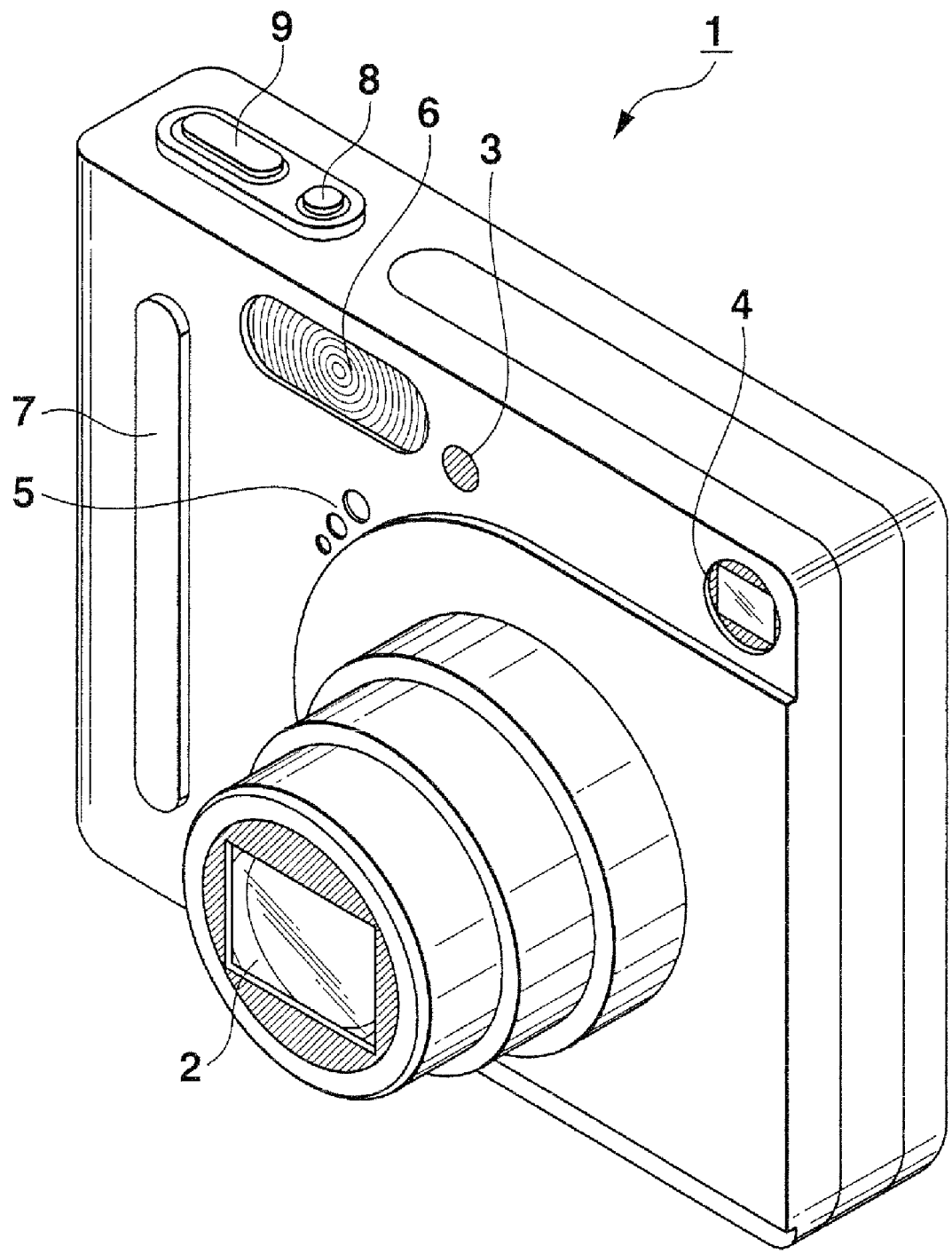
FIG. 1 is a perspective view showing the outer appearance of a digital still camera according to the first embodiment of the present invention.

FIG. 1 shows the outer appearance of the digital still camera, and mainly shows the arrangements of the front and top surfaces.

A digital still camera 1 comprises, on the front surface of an almost rectangular thin-plate like metal outer body, a photographing lens 2, self-timer lamp 3, optical viewfinder window 4, microphone 5, flash emission unit 6, and gripper bar 7. A power key 8 and shutter key 9 (designation unit) are arranged on the right end (viewed from the user) of the top surface.

The photographing lens 2 has an AF function and a zoom function of changing the focal length in a stepless manner. The photographing lens 2 collapses into the body in power-off or playback serving as a basic mode.

The gripper bar 7 is a band-like metal projection which is buried so that the user can reliably grip the housing with the middle, third, and little fingers of his right hand when he grips the digital still camera 1 with his right hand from the right side surface of the housing in photographing.

The power key 8 is a key operated to turn on/off the power supply. The shutter key 9 designates the photographing timing in the photographing mode.

Although not shown, the rear surface of the digital still camera 1 is equipped with a mode switch, speaker, menu key, cross key (exposure setting unit), set key, optical viewfinder, flash charge lamp, display, and the like.

Although not shown, the bottom surface of the digital still camera 1 is equipped with a memory card slot for allowing the operator to insert/remove a memory card used as a recording medium, and a USB (Universal Serial Bus) connector as a serial interface connector for connecting an external personal computer or the like.

The electronic circuit configuration of the digital still camera 1 will be explained with reference to FIG. 2.

Figure 2:
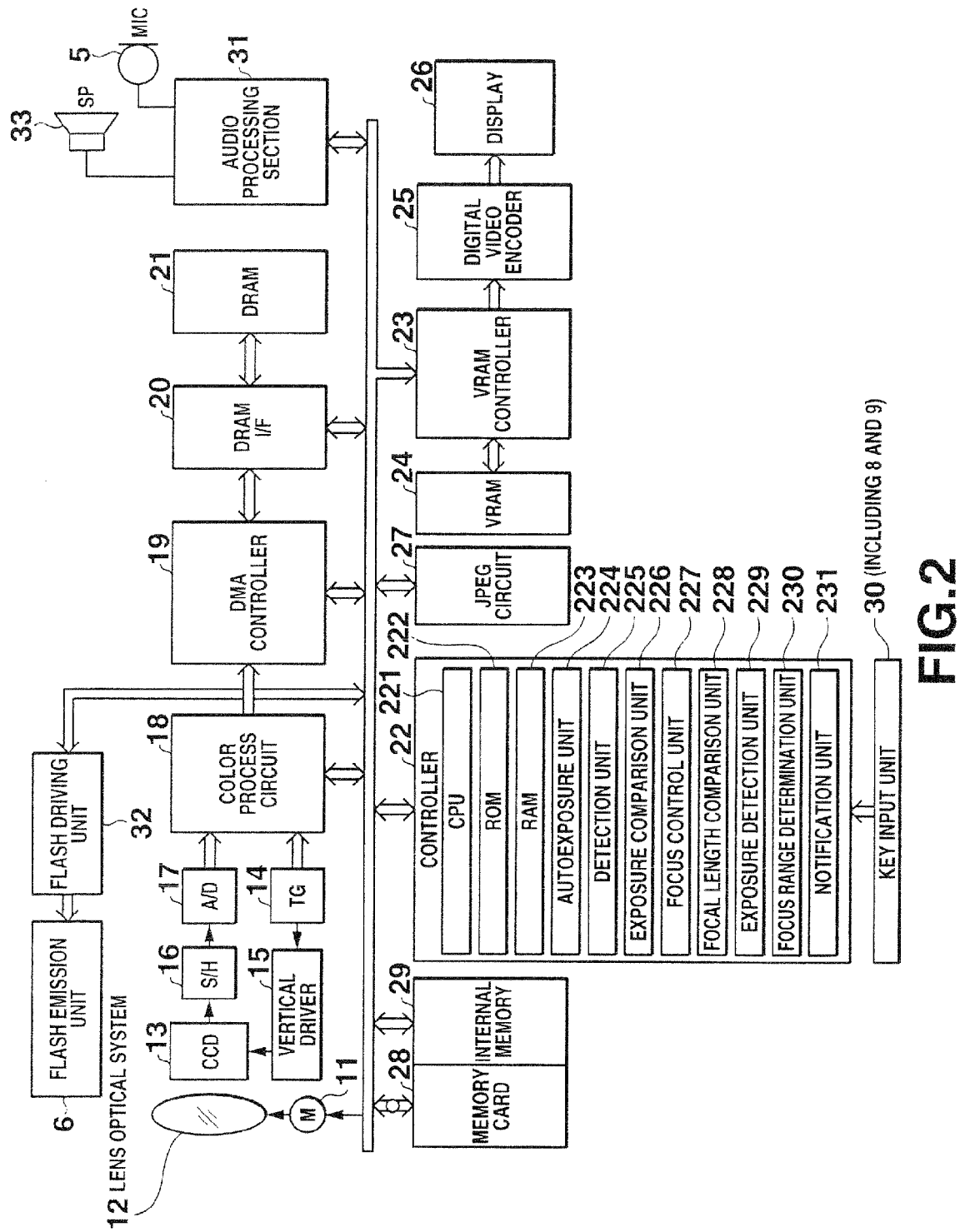
FIG. 2 is a block diagram showing the functional configuration of an electronic circuit according to the first embodiment.

In FIG. 2, in the photographing mode serving as a basic mode, a timing generator (TG) 14 and vertical driver 15 scan and drive a CCD 13 serving as an image sensing element arranged on the back side of the photographing optical axis of a lens optical system 12 which changes the in-focus position or stop position by driving of a motor (M) 11 and forms the photographing lens 2. The CCD 13 outputs a photoelectrically converted output of one frame that corresponds to an optical image formed every predetermined cycle. The motor (M) 11, lens optical system 12, and CCD 13 form a photographing unit.

The photoelectrically converted output properly undergoes gain adjustment for each of primary color components R, G, and B in the state of a signal of an analog value. The resultant signal is sampled and held by a sample-and-hold circuit (S/H) 16, and converted into digital data by an A/D converter 17. The digital data undergoes a color process including a pixel interpolation process and γ correction process by a color process circuit 18 to generate a luminance signal Y and color difference signals Cb and Cr of digital values. These signals are output to a DMA (Direct Memory Access) controller 19.

The DMA controller 19 temporarily writes the luminance signal Y and color difference signals Cb and Cr output from the color process circuit 18 in the internal buffer of the DMA controller 19 by using a composite sync signal, memory write enable signal, and clock signal from the color process circuit 18. The luminance signal Y and color difference signals Cb and Cr are then DMA-transferred to a DRAM 21 used as a buffer memory via a DRAM interface (I/F) 20.

A controller 22 is comprised of a CPU 221, a ROM 222 which permanently stores an operating program that includes a process to the operation of the shutter key 9 in the photographing mode (to be described later) and is executed by the CPU 221, a RAM 223 used as a work memory, an autoexposure unit 224 which automatically sets a correct exposure value in the photographing mode, a detection unit 225 which detects the designated operation state of the shutter key 9, an exposure comparison unit 226 which compares the correct exposure value with a preset exposure value, an exposure detection unit 229 which detects that an arbitrary exposure value is set, a focal length comparison unit 228 which compares the current focal length in the photographing mode with a preset focal length, a focus control unit 227 which prompts the user to select whether to operate the autofocus function or set a fixed-focus position in the photographing mode, a focus range determination unit 230 which determines a fixed-focus range containing an object to be photographed from a plurality of fixed-focus ranges in the photographing mode, and a notification unit 231 which notifies the user of the result of determining the fixed-focus range. The controller 22 controls whole control operation of the digital still camera 1.

At the end of DMA transfer of the luminance and color difference signals to the DRAM 21, the controller 22 reads out the luminance and color difference signals from the DRAM 21 via the DRAM interface 20, and writes these signals in a VRAM 24 via a VRAM controller 23.

A digital video encoder 25 periodically reads out the luminance and color difference signals from the VRAM 24 via the VRAM controller 23, generates a video signal on the basis of these data, and outputs the video signal to a display 26.

The display 26 is arranged on the rear surface of the digital still camera 1, as described above. The display 26 functions as a monitor display (electronic viewfinder) in the photographing mode. The display 26 performs display based on the video signal from the digital video encoder 25, and displays in real time an image based on image information received from the VRAM controller 23 at this time.

In a so-called through image display state in which the display 26 displays the current image as a monitor image in real time, the shutter key 9 is operated at a timing when a still image is to be taken, and then a trigger signal is generated.

The controller 22 stops DMA transfer of the luminance and color difference signals of one frame from the CCD 13 to the DRAM 21 in response to the trigger signal. The controller 22 drives the CCD 13 at an F-number and shutter speed complying with correct exposure conditions, obtains luminance and color difference signals of one frame, and transfers them to the DRAM 21. After that, the controller 22 disconnects this route, and transits to a recording/save state.

In the recording/save state, the controller 22 reads out the luminance and color difference signals of one frame written in the DRAM 21 via the DRAM interface 20 for a unit called a basic block of vertical 8 pixels × horizontal 8 pixels for each of the Y, Cb, and Cr components. The controller 22 writes the signals in a JPEG (Joint Photograph coding Experts Group) circuit 27. The JPEG circuit 27 compresses data by processes such as ADCT (Adaptive Discrete Cosine Transform) and entropy coding (e.g., Huffman coding).

The controller 22 reads outs the encoded data as a data file of one image from the JPEG circuit 27, and writes the data file in a memory card 28 detachably mountable as a recording medium of the digital still camera 1 or an internal memory 29 which is permanently incorporated in the digital still camera 1.

The controller 22 activates the route extending from the CCD 13 to the DRAM 21 again upon the end of the compression process for luminance and color difference signals of one frame and write of compressed data in the memory card 28 or internal memory 29.

The controller 22 is connected to a key input unit 30, audio processing unit 31, and flash driving unit 32.

The key input unit 30 is made up of the power key 8, shutter key 9, mode switch, menu key, cross key, set key, and the like. Signals accompanying these key operations are directly sent to the controller 22.

The audio processing unit 31 comprises a sound source circuit such as a PCM sound source. In recording a sound, the audio processing unit 31 digitizes an audio signal input from the microphone (MIC) 5, and compresses data in accordance with a predetermined data file format, e.g., MP3 (MPEG-1 audio layer 3) standard. The audio processing unit 31 creates an audio data file and sends it to the memory card 28 or internal memory 29. In playing back a sound, the audio processing unit 31 decompresses an audio data file sent from the memory card 28 or internal memory 29, and converts the data into an analog signal. The audio processing unit 31 drives a speaker (SP) 33 arranged on the rear surface of the digital still camera 1, and outputs the sound from the speaker (SP) 33.

In taking a still image, the flash driving unit 32 charges a large-capacity flash capacitor (not shown), and drives the flash emission unit 6 under the control of the controller 22 to emit flash light.

In taking not a still image but a motion image, still image data files prepared by compressing still image data by the JPEG circuit 27 are temporarily successively recorded on the memory card 28 or internal memory 29 while the shutter key 9 is kept operated. When the operation of the shutter key 9 ends or a predetermined time limit of, e.g., 30 sec has elapsed, a series of still image data files are set again as a motion JPEG data file (AVI file) at once.

In the playback mode as a basic mode, the controller 22 selectively reads out image data recorded on the memory card 28 or internal memory 29. The JPEG circuit 27 decompresses the compressed image data in procedures opposite to data compression procedures in the photographing mode. The decompressed image data are held in the DRAM 21 via the DRAM interface 20, and the contents held by the DRAM 21 are stored in the VRAM 24 via the VRAM controller 23. The image data are periodically read out from the VRAM 24 to generate video signals, and the video signals are played back on the display 26.

When selected image data represent not still images but motion images, respective still image data which form the selected motion image file are temporarily successively played back. At the end of playing back all the still image data, only still image data at the start is played back and displayed until the next playback instruction is received.

The operation of the first embodiment will be explained.

The following processes are basically executed by the controller 22 on the basis of a permanently stored program.

In the first embodiment, the shutter key 9 operates by two stroke operations. As the basic operation, AF operation is executed to lock an in-focus state and exposure state by the first stroke generally called a "half stroke". Photographing in the locked in-focus state and exposure state is executed by the second stroke generally called a "full stroke".

Figure 3:
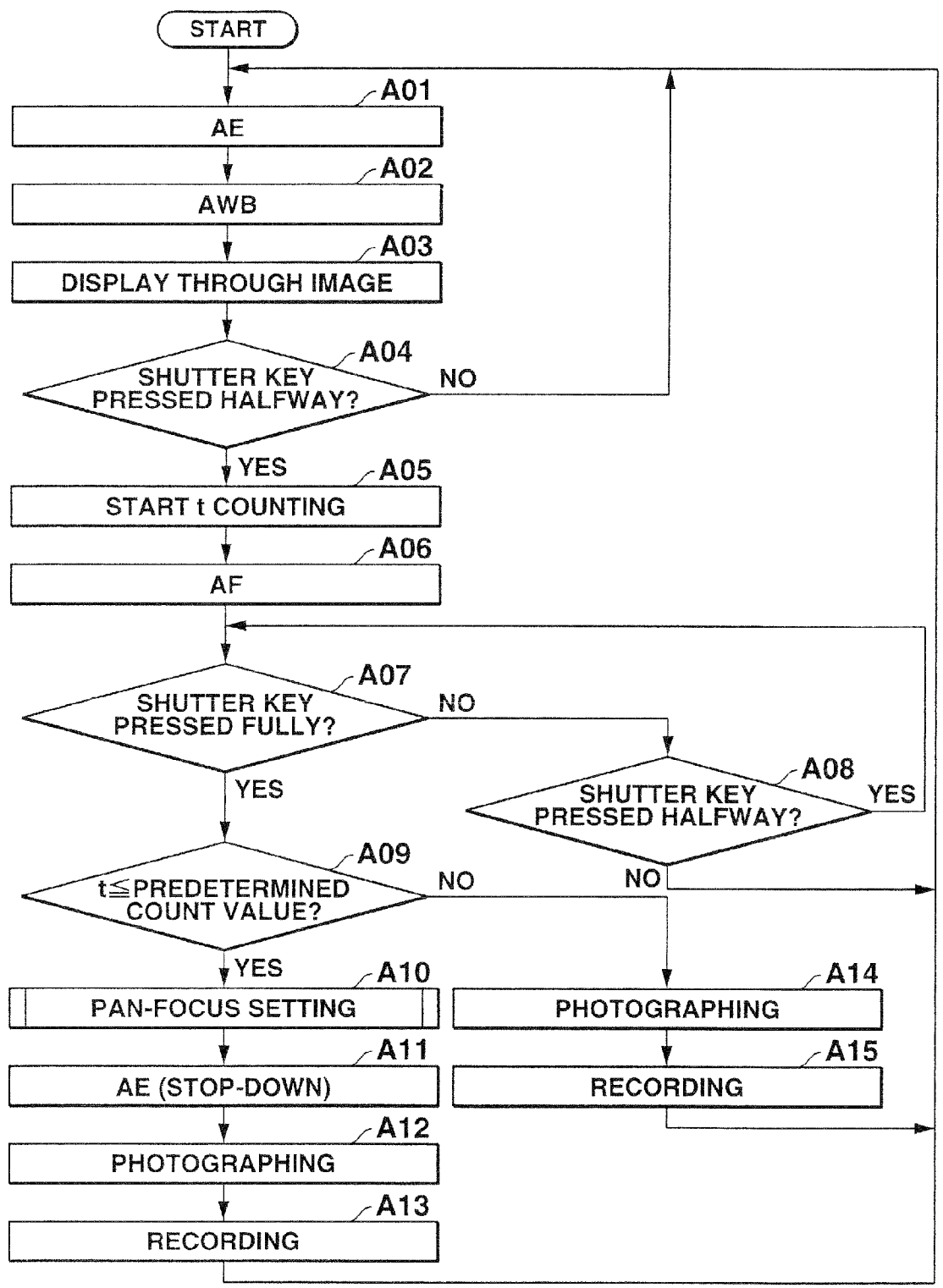
FIG. 3 is a flowchart showing the process contents of a photographing mode according to the first embodiment.

FIG. 3 shows process contents in the photographing mode. An AE process is first executed at a focal length corresponding to the currently selected zoom position of the photographing lens 2. A correct exposure value is obtained to set an F-number and shutter speed (step A01).

The shutter speed is adjusted to a value corresponding to the frame rate of the monitor state, e.g., to a speed much higher than 1/30 [sec] for a frame rate of 30 frames/[sec]. An image is obtained from the CCD 13, and adjusted by the color process circuit 18 so that the white balance corresponds to the color temperature of the light source by an auto white balance (AWB) process (step A02). While a through image is displayed on the display 26 (step A03), whether the shutter key 9 of the key input unit 30 is pressed halfway is determined (step A04). This process is repetitively executed until the shutter key 9 is pressed halfway.

If the shutter key 9 is pressed halfway, this state is determined in step A04. Counting operation of an internal counter t which counts an elapsed time in the half stroke state starts (step A05). An AF process is so performed as to focus the lens to a predetermined focus area, and the in-focus position is locked (step A06). At the same time, the F-number and shutter speed which have been acquired in the AE process of immediately preceding step A01 and provide correct exposure are locked.

Whether the shutter key 9 is pressed fully in the state in which the photographing conditions are locked (step A07), and whether the shutter key 9 is kept pressed halfway (step A08) are repetitively determined. While the shutter key 9 is confirmed to be kept pressed halfway, the flow waits until the shutter key 9 is pressed fully.

If the half stroke of the shutter key 9 is canceled, this state is determined in step A08, the photographing conditions are unlocked, and the flow returns to the process from step A01 again.

If the shutter key 9 is pressed fully in the state in which the photographing conditions are locked, this state is determined in step A07, and whether the count value of the internal counter t of the controller 22 is equal to or smaller than a predetermined value, e.g., a value corresponding to time 1 [sec] is determined (step A09). The time represented by the predetermined value for the count value of the internal counter t can be arbitrarily set by the user in advance.

If the count value of the internal counter t is determined to be larger than the predetermined value, it is determined that a corresponding time has elapsed during a shift from the half stroke to full stroke of the shutter key 9 and no quick photographing is required. The camera shifts to the image data recording/save state based on basic operation.

More specifically, image data by photographing is obtained while the photographing conditions are kept locked (step A14). The image data obtained by photographing is recorded and saved as a file in the memory card 28 or internal memory 29 (step A15). A series of photographing processes end, and the flow returns to the process from step A01 again in order to prepare for the next photographing.

If the count value of the internal counter t is determined in step A09 to be equal to or smaller than the predetermined value, the user is determined to want to quickly operate the shutter key 9 and immediately photograph an object. In order to set a state close to the pan-focus, a predetermined in-focus position which corresponds to the current zoom position of the photographing lens 2 and provides the depth of field as large as possible is fixed and set (step A10).

Figure 4:
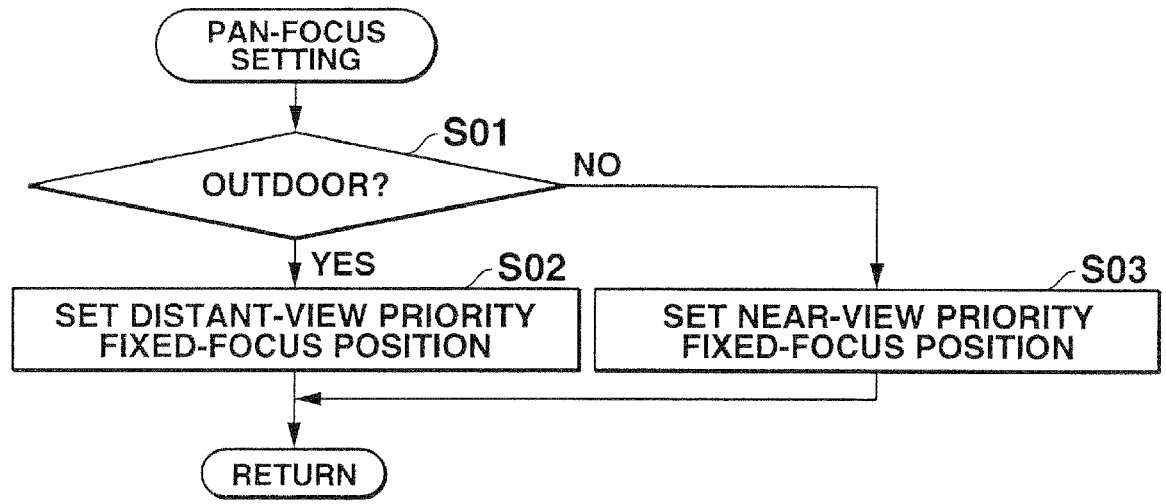
FIG. 4 is a flowchart showing the process contents of a pan-focus setting subroutine according to the first embodiment (to the third embodiment)

FIG. 4 shows a subroutine representing detailed contents of the pan-focus process. Whether the digital still camera 1 is used outdoors at this time is determined from whether the color temperature of the light source obtained by the auto white balance process in immediately preceding step A02 is the color temperature of sunlight (step S01).

In this case, the lens optical system 12 which forms the photographing lens 2 has two fixed-focus ranges: a near-view fixed-focus range in which the lens is always focused on an object within a range of, e.g., 0.4 [m] to 10 [m], and a distant-view fixed-focus range in which the lens is always focused on an object within a range of 1.5 [m] to infinity (∞).

If it is determined in step S01 that the color temperature of the light source obtained by the auto white balance process is that of sunlight and the camera 1 is used outdoors, the object is determined to be distant from the camera 1 to a certain degree. The position of the lens optical system 12 is set to the distant-view fixed-focus range (step S02), and the pan-focus setting subroutine ends.

If it is determined in step S01 that the color temperature of the light source obtained by the auto white balance process is not that of sunlight and the camera 1 is not used outdoors, the object is determined to be close to the camera 1 to a certain degree. The position of the lens optical system 12 is set to the near-view fixed-focus range (step S03), and the pan-focus setting subroutine ends.

Referring back to FIG. 3, a so-called stop-down AE process of setting the F-number as large as possible from the correct exposure value obtained in immediately preceding step A01 and decreasing the shutter speed in correspondence with the F-number is executed together with the pan-focus process in step A10 (step A11). Immediately after this process, the camera shifts to the image data recording/save state.

More specifically, image data by image sensing is obtained (step A12). The image data obtained by photographing is recorded and saved as a file in the memory card 28 or internal memory 29 (step A13). A series of photographing processes end, and the flow returns to the process from step A01 again in order to prepare for the next photographing.

In this manner, the autofocus and fixed focus can be arbitrarily switched and selected in accordance with the operation state of the shutter key 9 having two operation strokes. Quick photographing operation can be executed, as needed.

Especially when the time of the shutter key 9 from operation of the first stroke to operation of the second stroke is equal to or shorter than a predetermined value, photographing is so executed as to set the pan-focus. When it is detected that the user wants to shift to quick photographing even during the flow of the general autofocus process, the pan-focus is intentionally set, and photographing can shift to a state in which a so-called out-of-focus state hardly occurs.

In addition, a range corresponding to photographing conditions is determined as a pan-focus setting from a plurality of, e.g., two fixed-focus ranges. In switching to and selecting a fixed-focus position, the determined fixed-focus range is selected. Photographing can be executed while the lens is more accurately focused on an object.

As an example of the fixed-focus range determination requirement, whether an object image is to be taken indoors or outdoors is determined from the result of color temperature adjustment for the light source by using the auto white balance function. The fixed-focus range in which the object image is located can be more accurately determined without any burden on the user. Photographing can be executed while the lens is much more accurately focused.

As an example of outputting a recording result together with photographing in step A12 and subsequent recording/save in step A13, the fixed-focus range set in step S02 or S03 may be expressed by a numerical value and displayed on the display 26 of the camera 1.

Figure 5:
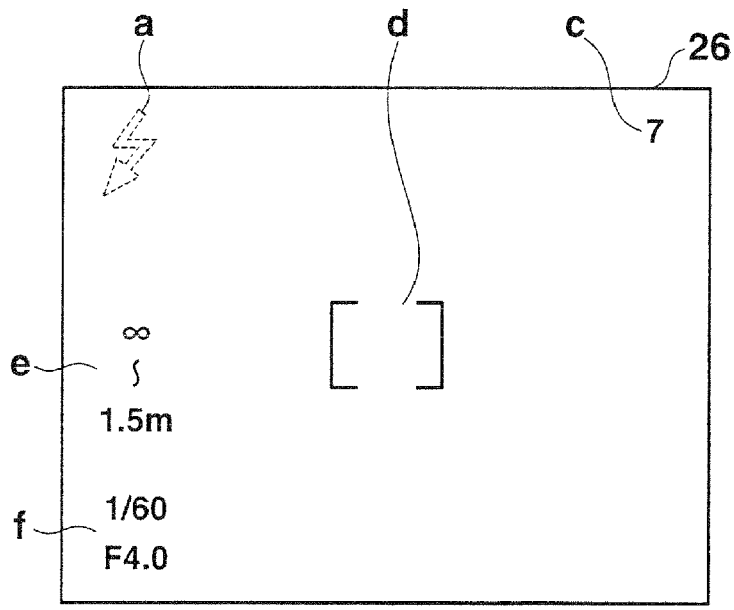
FIG. 5 is a view showing an example of a data display state after photographing in pan-focus setting according to the first embodiment.

FIG. 5 shows an example in which the fixed-focus range is displayed as one of various photographing data on the display 26 for a predetermined time immediately after photographing. In FIG. 5, a flash emission mode a, a remaining number c of photographable images, a focus frame d, a fixed-focus range e, and an exposure value (shutter speed and F-number) f are properly distributed and displayed on the display 26.

As the fixed-focus range e, the distant-view fixed-focus range is represented by a concrete numerical value "1.5 m to infinity (∞), as shown in FIG. 5. By representing the in-focus range of a photographed image, the user is prompted to recognize the contents and if necessary, immediately execute photographing again.

Second Embodiment

The second embodiment in which the present invention is applied to a digital still camera will be described with reference to the several views of the accompanying drawing.

The outer appearance is basically the same as that in FIG. 1, and the electronic circuit configuration is basically the same as that in FIG. 2. The same numerals denote the same parts, and an illustration and description thereof will be omitted.

The operation of the second embodiment will be explained.

The following processes are basically executed by a controller 22 on the basis of a permanently stored program.

In the second embodiment, a shutter key 9 operates by two stroke operations. As the basic operation, AF operation is executed to lock an in-focus state and exposure state by the first stroke generally called a "half stroke". Photographing in the locked in-focus state and exposure state is executed by the second stroke generally called a "full stroke".

Figure 6:
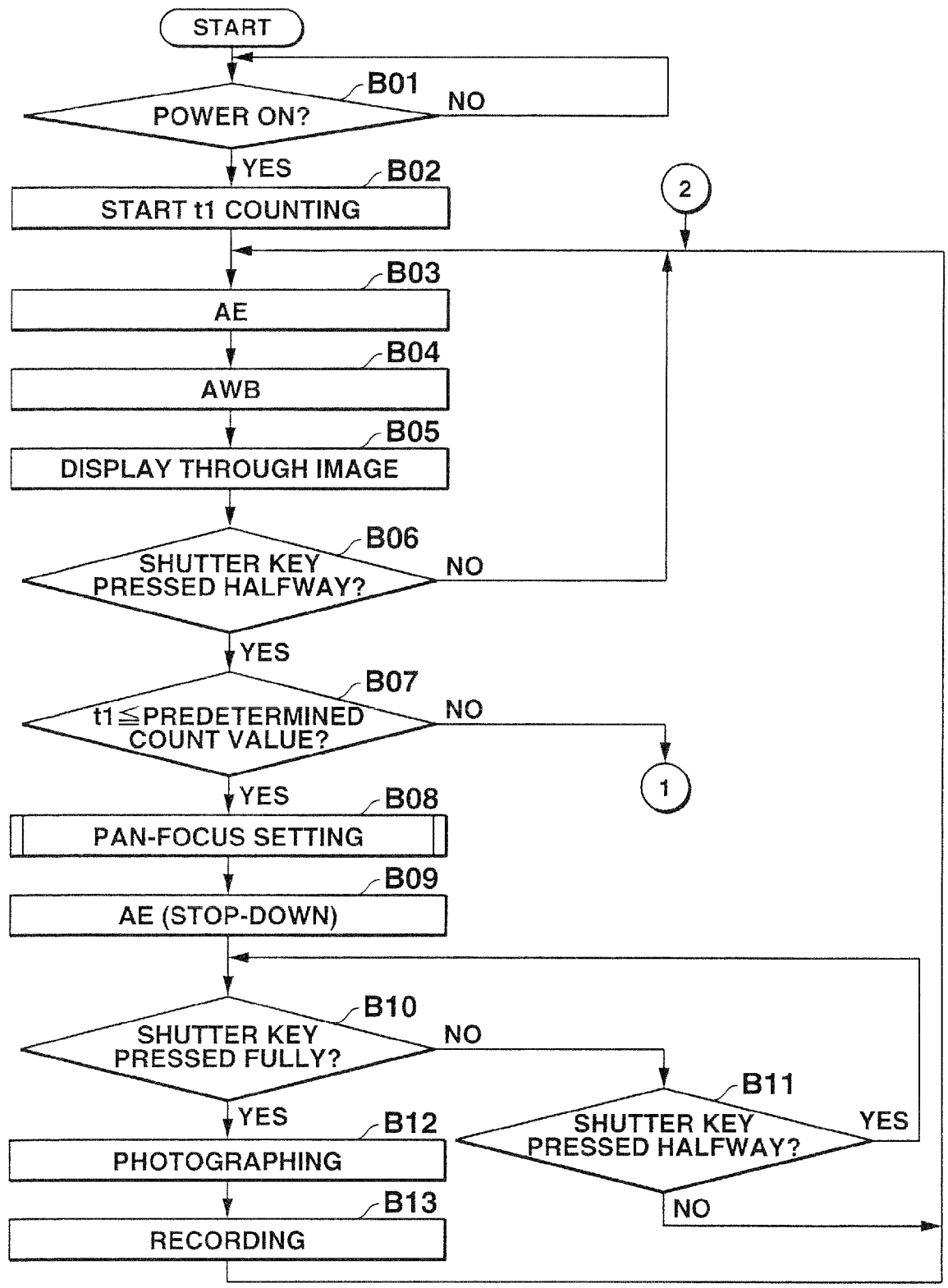
FIG. 6 is a flowchart showing power-on of a digital still camera and the process contents of the photographing mode in the digital still camera according to the second embodiment of the present invention.
Figure 7:
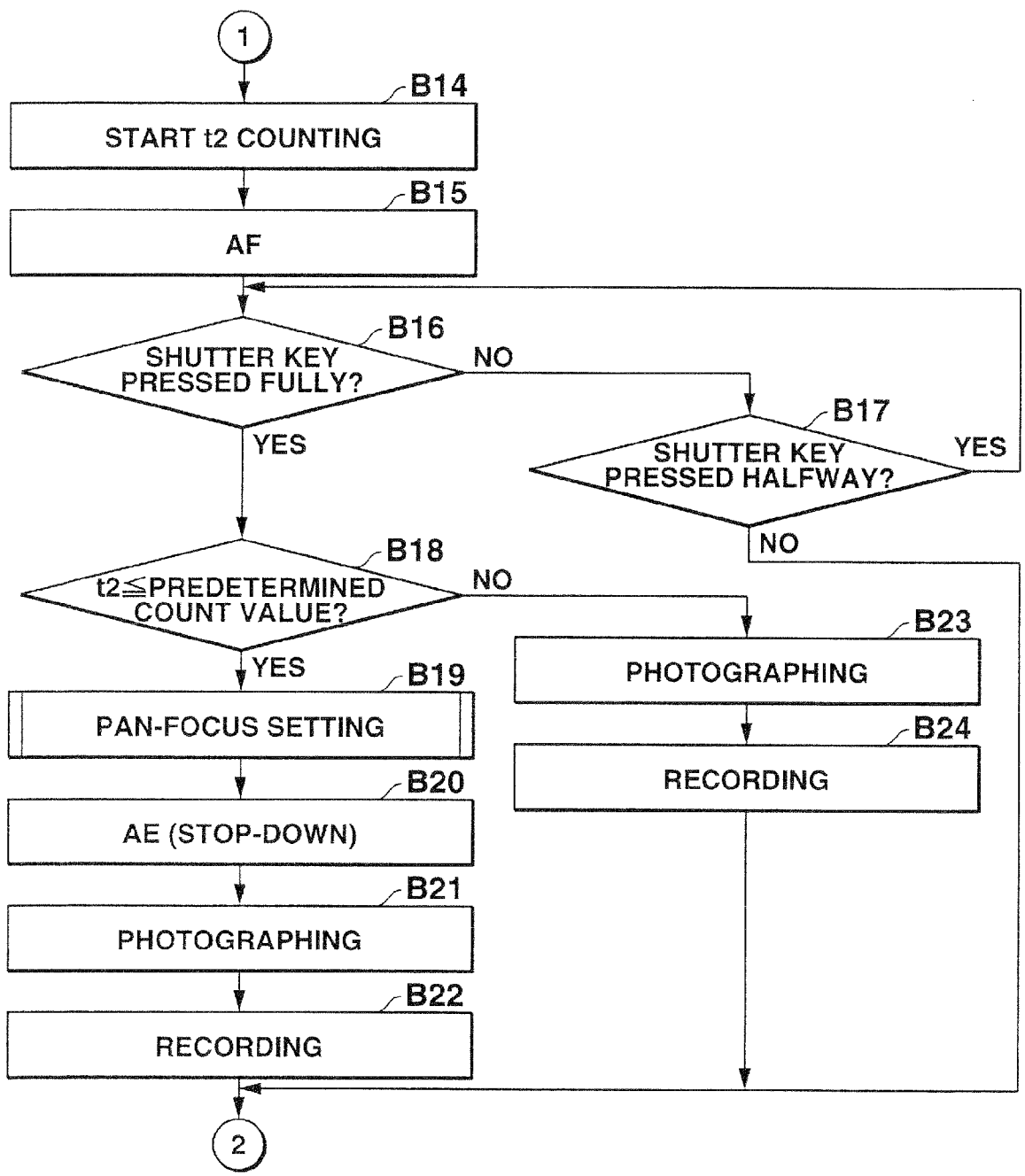
FIG. 7 is a flowchart showing the process contents of the photographing mode in the digital still camera according to the second embodiment.

FIGS. 6 and 7 show power-on operation along with the operation of a power key 8 and process contents in the photographing mode as a basic mode automatically set after power-on. The flow waits until the power supply is turned on by the operation of the power key 8 (step B01).

If the power supply is turned on by the operation of the power key 8, the controller 22 determines this state in step B01, and starts counting operation of an internal counter t1 which counts an elapsed time after power-on (step B02).

An AE process is executed at a focal length corresponding to the currently selected zoom position of a photographing lens 2. A correct exposure value is obtained to set an F-number and shutter speed (step B03).

The shutter speed is adjusted to a value corresponding to the frame rate of the monitor state, e.g., to a speed much higher than 1/30 [sec] for a frame rate of 30 frames/[sec]. An image is obtained from a CCD 13, and adjusted by a color process circuit 18 so that the white balance corresponds to the color temperature of the light source by an auto white balance (AWB) process (step B04). While a through image is displayed on a display 26 (step B05), whether the shutter key 9 of a key input unit 30 is pressed halfway is determined (step B06). This process is repetitively executed until the shutter key 9 is pressed halfway.

If the shutter key 9 is pressed halfway, this state is determined in step BOS. Whether the count value of the internal counter t1 of the controller 22 is equal to or a smaller than a predetermined value, e.g., a value corresponding to time 5 [sec] is determined (step B07). The time represented by the predetermined value for the count value of the internal counter t1 can be arbitrarily set by the user in advance.

If the count value of the internal counter t1 is equal to or smaller than the predetermined value, it is determined that no long time has elapsed after the power-on timing by the operation of the power key 8 and the user wants to quickly operate the shutter key 9 and immediately photograph an object. In order to set a state close to the pan-focus, a predetermined in-focus position which corresponds to the current zoom position of the photographing lens 2 and provides the depth of field as large as possible is fixed and set (step B08).

In pan-focus setting as shown in FIG. 4, whether a digital still camera 1 is used outdoors at this time is determined from whether the color temperature of the light source obtained by the auto white balance process in immediately preceding step B04 is the color temperature of sunlight (step S01).

In this case, a lens optical system 12 which forms the photographing lens 2 has two fixed-focus ranges: a near-view fixed-focus range in which the lens is always focused on an object within a range of, e.g., 0.4 [m] to 10 [m], and a distant-view fixed-focus range in which the lens is always focused on an object within a range of 1.5 [m] to infinity (∞).

If it is determined in step S01 that the color temperature of the light source obtained by the auto white balance process is that of sunlight and the camera 1 is used outdoors, the object is determined to be distant from the camera 1 to a certain degree. The position of the lens optical system 12 is set to the distant-view fixed-focus range (step S02), and the pan-focus setting subroutine ends.

If it is determined in step S01 that the color temperature of the light source obtained by the auto white balance process is not that of sunlight and the camera 1 is not used outdoors, the object is determined to be close to the camera 1 to a certain degree. The position of the lens optical system 12 is set to the near-view fixed-focus range (step S03), and the pan-focus setting subroutine ends.

Referring back to FIG. 6, a so-called stop-down AE process of setting the F-number as large as possible from the correct exposure value obtained in immediately preceding step B03 and decreasing the shutter speed in correspondence with the F-number is executed together with the pan-focus process in step B08 (step B09). Whether the shutter key 9 is pressed fully (step B10), and whether the shutter key 9 is kept pressed halfway (step B11) are repetitively determined. While the shutter key 9 is confirmed to be kept pressed halfway, the flow waits until the shutter key 9 is pressed fully.

If the half stroke of the shutter key 9 is canceled, this state is determined in step B11, the photographing conditions for obtaining the pan-focus state are unlocked, and the flow returns to the process from step B03 again.

If the shutter key 9 is pressed fully in the state in which the photographing conditions are locked, this state is determined in step B10, and the camera immediately shifts to the image data recording/save state.

More specifically, image data by image sensing is obtained (step B12), and the image data obtained by photographing is recorded and saved as a file in a memory card 28 or internal memory 29 (step B13). A series of photographing processes end, and the flow returns to the process from step B03 again in order to prepare for the next photographing.

If the count value of the internal counter t1 which counts an elapsed time after power-on is larger than the predetermined value in step B07, it is determined that a corresponding time has elapsed from the power-on timing by the operation of the power key 8 and no quick photographing is required. Counting operation of an internal counter t2 which counts an elapsed time after the half stroke of the shutter key 9 starts (step B14). An AF process is performed to obtain an in-focus position so as to focus the lens to a predetermined focus area, and the in-focus position is obtained and locked (step B15). At the same time, the F-number and shutter speed which have been acquired in the AE process of immediately preceding step B03 and provide correct exposure are determined and locked.

Whether the shutter key 9 is pressed fully in the state in which the photographing conditions are locked (step B16), and whether the shutter key 9 is kept pressed halfway (step B17) are repetitively determined. While the shutter key 9 is confirmed to be kept pressed halfway, the flow waits until the shutter key 9 is pressed fully.

If the half stroke of the shutter key 9 is canceled, this state is determined in step B17, the photographing conditions are unlocked, and the flow returns to the process from step B03 again.

If the shutter key 9 is pressed fully in the state in which the photographing conditions are locked, this state is determined in step B16, and whether the count value of the internal counter t2 of the controller 22 is equal to or smaller than a predetermined value, e.g., a value corresponding to time 1 [sec] is determined (step B18). The time represented by the predetermined value for the count value of the internal counter t2 can be arbitrarily set by the user in advance.

If the count value of the internal counter t2 is determined to be larger than the predetermined value, it is determined that a corresponding time has elapsed from the half stroke to full stroke of the shutter key 9 and no quick photographing is required.

The camera shifts to the general image data recording/save state.

More specifically, image data by image sensing is obtained (step B23), and the image data obtained by photographing is recorded and saved as a file in the memory card 28 or internal memory 29 (step B24). A series of photographing processes end, and the flow returns to the process from step B03 again in order to prepare for the next photographing.

If the count value of the internal counter t2 is equal to or smaller than the predetermined value in step B18, it is determined that no long time has elapsed from the half stroke to full stroke of the shutter key 9 and the user wants to quickly operate the shutter key 9 and immediately photograph an object. In order to set a state close to the pan-focus, a predetermined in-focus position which corresponds to the current zoom position of the photographing lens 2 and provides the depth of field as large as possible is fixed and set (step B19).

In pan-focus setting as shown in FIG. 4, whether the digital still camera 1 is used outdoors at this time is determined from whether the color temperature of the light source obtained by the auto white balance process in immediately preceding step B04 is the color temperature of sunlight (step S01).

If it is determined in step S01 that the color temperature of the light source obtained by the auto white balance process is that of sunlight and the camera 1 is used outdoors, the object is determined to be distant from the camera 1 to a certain degree. The position of the lens optical system 12 is set to the distant-view fixed-focus range (step S02), and the pan-focus setting subroutine ends.

If it is determined in step S01 that the color temperature of the light source obtained by the auto white balance process is not that of sunlight and the camera 1 is not used outdoors, the object is determined to be close to the camera 1 to a certain degree.

The position of the lens optical system 12 is set to the near-view fixed-focus range (step S03), and the pan-focus setting subroutine ends.

Referring back to FIG. 7, a so-called stop-down AE process of setting the F-number as large as possible from the correct exposure value obtained in immediately preceding step B03 and decreasing the shutter speed in correspondence with the F-number is executed together with the pan-focus process in step B19 (step B20). The camera immediately shifts to the image data recording/save state.

After image data by image sensing is obtained (step B21), the obtained image data is recorded and saved as a file in the memory card 28 or internal memory 29 (step B22). A series of photographing processes end, and the flow returns to the process from step B03 again in order to prepare for the next photographing.

In addition to the description of the first embodiment, the second embodiment executes photographing in which the pan-focus is set by the half stroke of the shutter key 9 within only a predetermined time immediately after power-on. This embodiment is effective particularly for a case in which the power supply is turned on by the operation of the power key 8 from the power-off state of the digital still camera 1 and photographing is quickly executed at a fixed focus. This can further reduce the possibility of missing a photo opportunity.

Third Embodiment

The third embodiment in which the present invention is applied to a digital still camera will be described with reference to the several views of the accompanying drawing.

The outer appearance is basically the same as that in FIG. 1, and the electronic circuit configuration is basically the same as that in FIG. 2. The same numerals denote the same parts, and an illustration and description thereof will be omitted.

The operation of the third embodiment will be explained.

The following processes are basically executed by a controller 22 on the basis of a permanently stored program.

In the third embodiment, a shutter key 9 operates by two stroke operations. As the basic operation, AF operation is executed to lock an in-focus state and exposure state by the first stroke generally called a "half stroke". Photographing in the locked in-focus state and exposure state is executed by the second stroke generally called a "full stroke".

Figure 8:
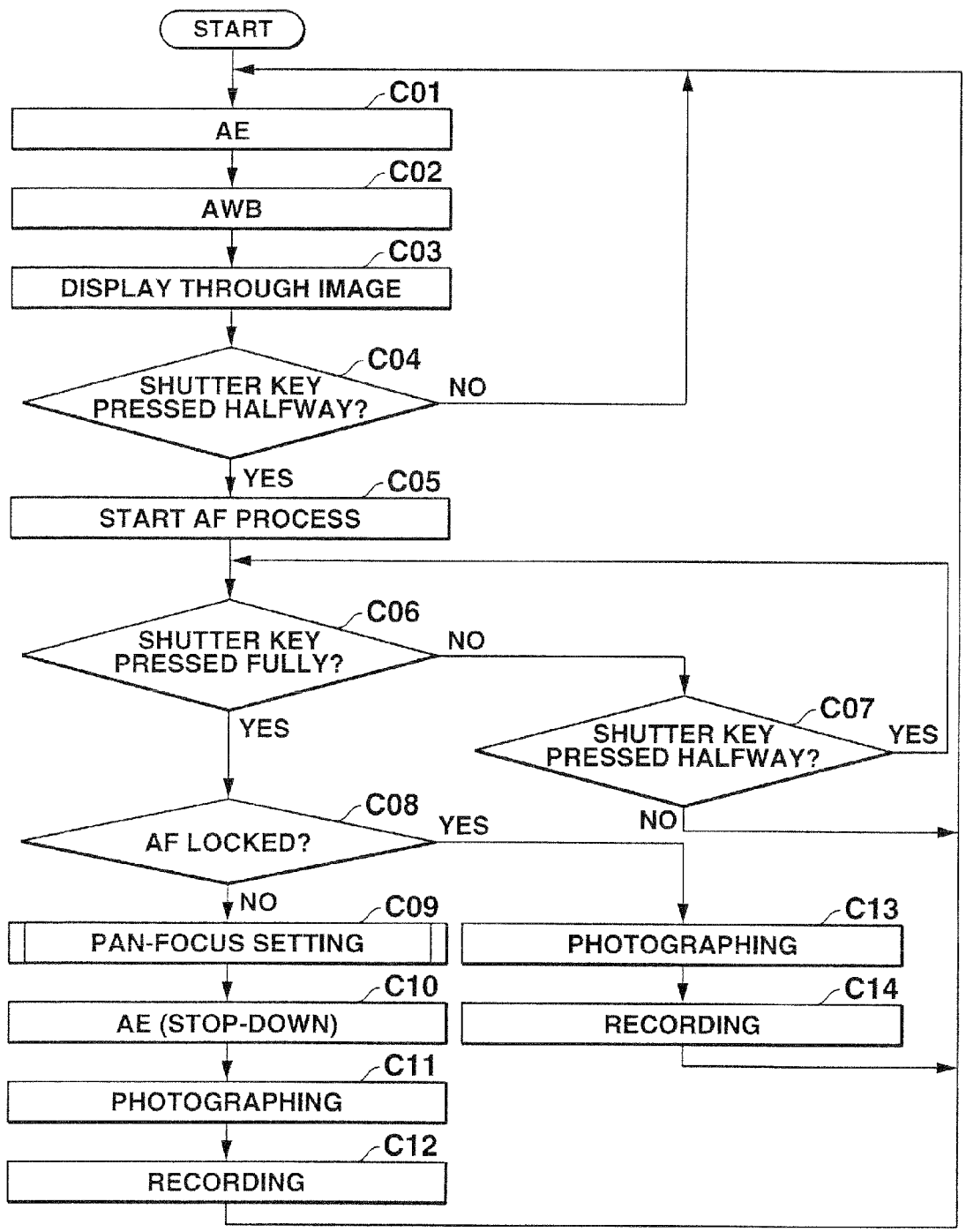
FIG. 8 is a flowchart showing the process contents of the photographing mode in a digital still camera according to the third embodiment of the present invention.

FIG. 8 shows process contents in the photographing mode. An AE process is first executed at a focal length corresponding to the currently selected zoom position of a photographing lens 2. A correct exposure value is obtained to set an F-number and shutter speed (step C01).

The shutter speed is adjusted to a value corresponding to the frame rate of the monitor state, e.g., to a speed much higher than 1/30 [sec] for a frame rate of 30 frames/[sec]. An image is obtained from a CCD 13, and adjusted by a color process circuit 18 so that the white balance corresponds to the color temperature of the light source by an auto white balance (AWB) process (step C02). While a through image is displayed on a display 26 (step C03), whether the shutter key 9 of a key input unit 30 is pressed halfway is determined (step C04). This process is repetitively executed until the shutter key 9 is pressed halfway.

If the shutter key 9 is pressed halfway, this state is determined in step C04. An AF process starts so as to focus the lens to a predetermined focus area (step C05). At the same time, the F-number and shutter speed which have been acquired in the AE process of immediately preceding step C01 and provide correct exposure are locked.

Whether the shutter key 9 is pressed fully immediately after the start of the AF process in step C05 (step C06), and whether the shutter key 9 is kept pressed halfway (step C07) are repetitively determined. While the shutter key 9 is confirmed to be kept pressed halfway, the flow waits until the shutter key 9 is pressed fully.

If the half stroke of the shutter key 9 is canceled, this state is determined in step C07, the photographing conditions are unlocked, and the flow returns to the process from step C01 again.

If the shutter key 9 is pressed fully, this state is determined in step C06, and whether the AF process which has started in step C05 has been completed and the in-focus position has been locked is determined (step C08).

If it is determined that the AF process has been completed and the in-focus position has been locked, it is determined that a time enough to execute the AF process has elapsed during a shift from the half stroke to full stroke of the shutter key 9 and no quick photographing is required. The camera shifts to the image data recording/save state based on basic operation.

More specifically, after image data by image sensing is obtained on the basis of the locked photographing conditions (step C13), the image data obtained by photographing is recorded and saved as a file in a memory card 28 or internal memory 29 (step C14). A series of photographing processes end, and the flow returns to the process from step C01 again in order to prepare for the next photographing.

If it is determined in step C0B that the in-focus position has not been locked and the AF process has not been completed, the user is determined to want to quickly operate the shutter key 9 and immediately photograph an object. In order to set a state close to the pan-focus, a predetermined in-focus position which corresponds to the current zoom position of the photographing lens 2 and provides the depth of field as large as possible is fixed and set (step C09).

In pan-focus setting as shown in FIG. 4, whether a digital still camera 1 is used outdoors at this time is determined from whether the color temperature of the light source obtained by the auto white balance process in immediately preceding step C02 is the color temperature of sunlight (step S01).

In this case, a lens optical system 12 which forms the photographing lens 2 has two fixed-focus ranges: a near-view fixed-focus range in which the lens is always focused on an object within a range of, e.g., 0.4 [m] to 10 [m], and a distant-view fixed-focus range in which the lens is always focused on an object within a range of 1.5 [m] to infinity (∞).

If it is determined in step S01 that the color temperature of the light source obtained by the auto white balance process is that of sunlight and the camera 1 is used outdoors, the object is determined to be distant from the camera 1 to a certain degree. The position of the lens optical system 12 is set to the distant-view fixed-focus range (step S02), and the pan-focus setting subroutine ends.

If it is determined in step S01 that the color temperature of the light source obtained by the auto white balance process is not that of sunlight and the camera 1 is not used outdoors, the object is determined to be close to the camera 1 to a certain degree. The position of the lens optical system 12 is set to the near-view fixed-focus range (step S03), and the pan-focus setting subroutine ends.

Referring back to FIG. 8, a so-called stop-down AE process of setting the F-number as large as possible from the correct exposure value obtained in immediately preceding step C01 and decreasing the shutter speed in correspondence with the F-number is executed together with the pan-focus process in step C09 (step C10).

The camera immediately shifts to the image data recording/save state.

More specifically, after image data by image sensing is obtained (step C11), the obtained image data is recorded and saved as a file in the memory card 28 or internal memory 29 (step C12). A series of photographing processes end, and the flow returns to the process from step C01 again in order to prepare for the next photographing.

When AF operation starts in response to the half stroke of the shutter key 9 and the shutter key 9 is pressed fully before the completion of AF operation, the setting is immediately switched to the pan-focus to execute photographing without continuing AF operation. Photographing at the pan-focus can be speedily executed in accordance with the purpose of user's operation, further reducing the possibility of missing a photo opportunity.

In the first to third embodiments, two, near-view and distant-view fixed ranges have been described. However, the present invention is not limited to this. The camera may have only one focus range or three or more focus ranges in accordance with, e.g., the optical characteristic of the lens optical system 12 which forms the photographing lens 2, or camera use specifications required in designing the digital still camera 1.

In the first to third embodiments, a plurality of fixed-focus ranges are set, and which of the fixed-focus ranges contains an object image is determined from the color temperature of the light source that is obtained by auto white balance adjustment. However, the present invention is not limited to this. For example, when the light source periodically flickers, it is a fluorescent light, and the camera is determined to be used indoors. Alternatively, indoor and outdoor locations are discriminated on the basis of the currently set flash emission mode, a selected scene program, or the like. In this manner, various methods of determining one of a plurality of set fixed-focus ranges are conceivable.

Fourth Embodiment

The fourth embodiment in which the present invention is applied to a CDMA (Code Division Multiple Access) cellular phone with a camera function will be described with reference to the several views of the accompanying drawing.

FIGS. 9A and 9B show the outer appearance of a cellular phone 40 according to the fourth embodiment. The cellular phone 40 has a foldable shape in which two housings 42 and 43 are integrally assembled pivotally within a predetermined angle range via a hinge 41. FIG. 9A shows the inner surface when the cellular phone 40 is opened at maximum. FIG. 9B mainly shows the outer surface of the upper housing 42 when the cellular phone 40 is folded.

As shown in FIG. 9A, a speaker 44 serving as a receiver and a main display 45 are arranged on the inner surface of the upper housing 42.

Various keys 46 including a dial key and the like, and a microphone 47 serving as a transceiver are arranged on the inner surface of the lower housing 43.

As shown in FIG. 9B, a camera 48, photographing light 49, and sub-display 50 are arranged on the outer surface of the upper housing 42. An antenna 51 extending into the lower housing 43 externally projects from the hinge 41.

The camera 48 has an AF function and a zoom function of changing the focal length in a stepless manner.

The various keys 46 include a camera key 46a which sets a camera mode, and a set (SET) key 46b (designation unit) also functioning as a shutter key, in addition to a dial key, power key, and a key for channel connection/disconnection. Further, the various keys 46 include a shutter key 46c (designation unit) on a side end face of the hinge 41 that is not equipped with the antenna 51, and a ring key 46d (exposure setting unit) which designates, e.g., the zoom and exposure value of the camera 48 and is positioned using the set key 46b as a center.

Figure 10:
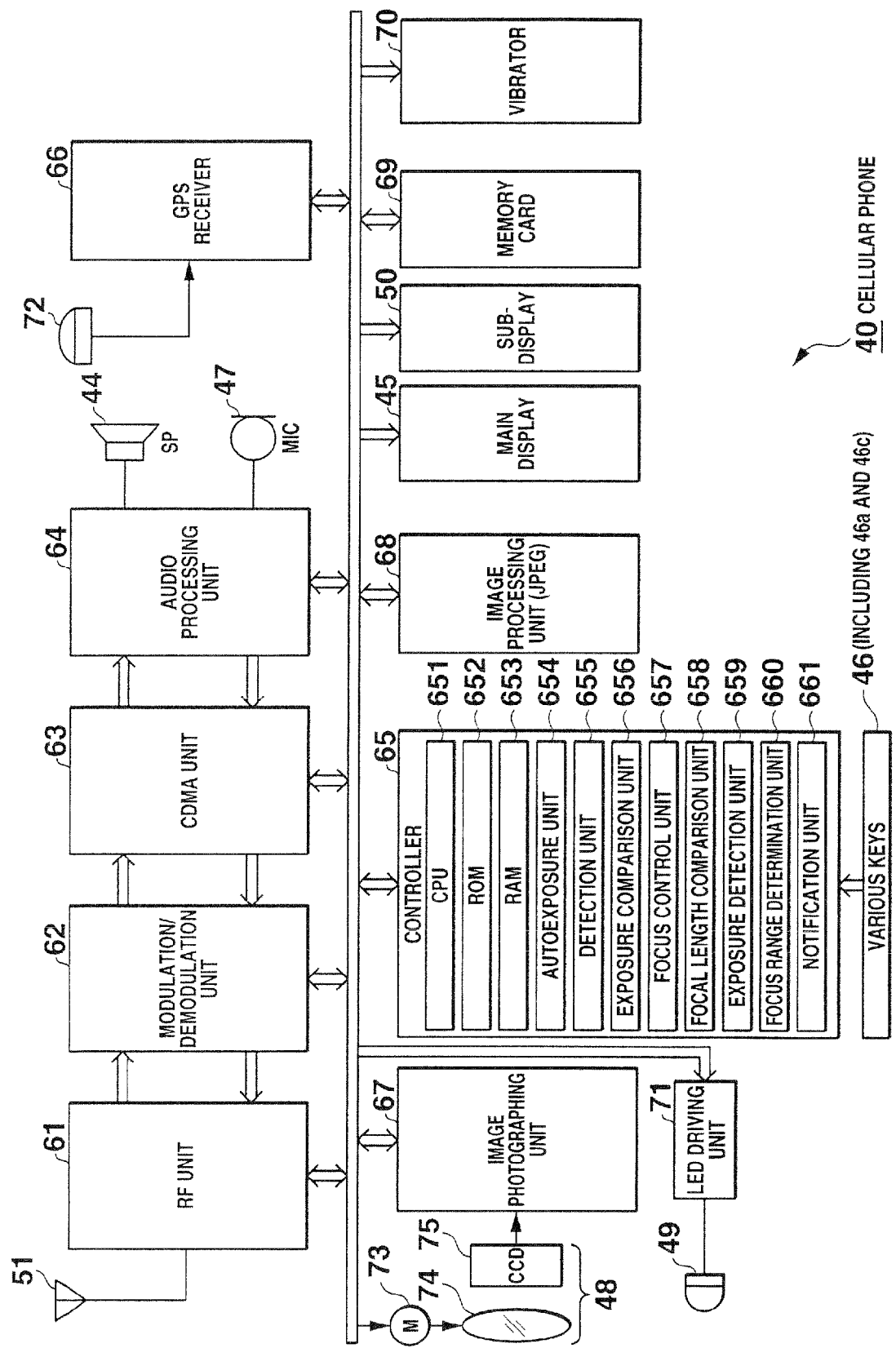
FIG. 10 is a block diagram showing the functional configuration of an electronic circuit according to the fourth embodiment.

FIG. 10 shows the circuit configuration of the cellular phone 40. In FIG. 10, the antenna 51 communicates with the nearest base station by CDMA. The antenna 51 is connected to an RF unit 61.

Upon reception, the RF unit 61 separates a signal input from the antenna 51 from the frequency axis by a duplexer. The RF unit 61 mixes the separated signal with a local oscillation signal of a predetermined frequency output from a PLL synthesizer to convert the frequency into an IF signal. The RF unit 61 extracts only a reception frequency channel by a broadband BPF, keeps the signal level of a desired reception wave constant by an AGC amplifier, and then outputs the resultant signal to a modulation/demodulation unit 62 on the output stroke.

In transmission, the RF unit 61 controls the transmission power of an OQPSK (Offset Quadri-Phase Shift Keying) modulated signal from the modulation/demodulation unit 62 by the AGC amplifier under the control of a controller 65 (to be described later). The RF unit 61 mixes the signal with a local oscillation signal of a predetermined frequency output from the PLL synthesizer to convert the frequency into the RF band. The RF unit 61 amplifiers the power to a large one by a PA (Power Amplifier), and radiates and transmits the resultant signal from the antenna 51 via the duplexer.

Upon reception, the modulation/demodulatlon unit 62 separates an IF signal from the RF unit 61 into a baseband I·Q (In-phase·Quadrature-phase) signal by a quadrature detector. The modulation/demodulation unit 62 digitizes the signal, and outputs it to a CDMA unit 63.

In transmission, the modulation/demodulation unit 62 converts an I·Q signal of a digital value sent from the CDMA unit 63 into an analog signal. The modulation/demodulation unit 62 OQPSK-modulates the analog signal by a quadrature modulator, and sends the modulated signal to the RF unit 61.

Upon reception, the CDMA unit 63 inputs a digital signal from the modulation/demodulation unit 62 to a timing extraction circuit for a PN (Pseudo Noise) code and a plurality of demodulation circuits which perform despreading and demodulation in accordance with an instruction for the timing circuit. The CDMA unit 63 synthesizes a plurality of demodulated symbols output from the demodulation circuits, synchronizes them by a synthesizer, and outputs the resultant signal to an audio processing unit 64.

In transmission, the CDMA unit 63 performs a spread process for an output symbol from the audio processing unit 64, limits the band by a digital filter to obtain an I·Q signal, and sends the I·Q signal to the modulation/demodulation unit 62.

Upon reception, the audio processing unit 64 deinterleaves an output symbol from the CDMA unit 63, and performs an error correction process by a Viterbi demodulator. After that, the audio processing unit 64 decompresses a compressed digital signal into a normal digital audio signal by an audio process DSP (Digital Signal Processor). The audio processing unit 64 converts the audio signal into an analog signal, and drives the speaker (SP) 44 to output the analog audio signal.

In transmission, the audio processing unit 64 converts an analog audio signal input from the microphone (MIC) 47 into a digital signal, and compresses the data amount by the audio process DSP. The audio processing unit 64 performs error correction coding by a convolution encoder, interleaves the signal, and sends the output symbol to the CDMA unit 63.

The controller 65 is connected to the RF unit 61, modulation/demodulation unit 62, CDMA unit 63, and audio processing unit 64. The controller 65 is also connected to a GPS receiver 66, an image photographing unit 67, an image processing unit 68, the main display 45, the sub-display 50, a memory card 69, a vibrator 70 and an LED driving unit 71.

The controller 65 is comprised of a CPU 651, a ROM 652 which permanently stores an operating program including photographing operation in a camera mode (to be described later), a RAM 653 used as a work memory, an autoexposure unit 654 which automatically sets a correct exposure value in the camera mode, a detection unit 655 which detects the designated operation states of the set key 46b and shutter key 46c, an exposure comparison unit 656 which compares the correct exposure value with a preset exposure value, an exposure detection unit 659 which detects that an arbitrary exposure value is set, a focal length comparison unit 658 which compares a current focal length in the camera mode with a preset focal length, a focus control unit 657 which prompts the user to select whether to operate the autofocus function or set a fixed-focus position in the camera mode, a focus range determination unit 660 which determines a fixed-focus range containing an object to be photographed from a plurality of fixed-focus ranges in the camera mode, and a notification unit 661 which notifies the user of the result of determining the fixed-focus range. The controller 65 controls the overall operation of the cellular phone 40.

The GPS receiver 66 calculates accurate current time and the latitude, longitude, and attitude of the current position on the basis of pieces of position measurement information from a plurality of GPS satellites that are received by a GPS antenna 72. The GPS receiver 66 outputs the calculated data to the controller 65.

Under the control of the controller 65, the image photographing unit 67 controls photographing operation of a CCD 75 which forms the camera 48 and is arranged on the back side of the photographing optical axis of an optical lens system 74 whose position is driven by a motor (M) 73. The image photographing unit 67 digitizes image data obtained by photographing, and outputs digital data. The motor (M) 73, optical lens system 74, and CCD 75 form a photographing unit.

The image processing unit 68 compresses image data obtained by the image photographing unit 67 on the basis of, e.g., the JPEG method. Further, the image processing unit 68 decompresses received/compressed image data to obtain original bitmap image data.

The memory card 69 is detachably mounted in the cellular phone 40, and stores image data photographed by the cellular phone 40, image data obtained by reception, and the like.

The vibrator 70 vibrates with a preset vibration pattern and vibration strength upon reception of an incoming signal.

The LED driving unit 71 is a driving circuit for a high-luminance white LED which forms the photographing light 49. If necessary, the LED driving unit 71 emits auxiliary light toward an object to be photographed by the camera 48.

Each of the main display 45 and sub-display 50 is made up of a reflection/transmission color liquid crystal panel with a backlight, and its driving circuit. The main display 45 and sub-display 50 can provide a transmission liquid crystal display by turning on the backlight, and also provide a reflection liquid crystal display using external light by turning off the backlight though it becomes slightly difficult to see the display.

Although not shown, the hinge 41 has a mechanism of detecting the open and folded states of the upper housing 42 and lower housing 43. In the open state in which the upper housing 42 and lower housing 43 are opened, as shown in FIG. 9A, in the camera mode shifted by operating the camera key 46a of the various keys 46 so as to take an image with the camera 48, the main display 45 determines on the basis of information from the detection mechanism that the user of the cellular phone 40 is to perform "target shooting" in which an object other than the user himself is to be photographed. The main display 45 stops the display on the sub-display 50, and displays the monitor image of the camera 48. At this time, image photographing is executed by operating either the set key 46b or shutter key 46c of the various keys 46.

To the contrary, in the folded state in which the upper housing 42 and lower housing 43 are folded, as shown in FIG. 9B, the main display 45 determines that the user of the cellular phone 40 is to perform "self-portrait shooting" in which the user himself is to be photographed. The main display 45 stops its display, and causes the sub-display 50 to display the monitor image of the camera 48. At this time, image photographing is executed by operating the shutter key 46c.

Similar to the digital still camera 1 according to the first to third embodiments, the cellular phone 40 can record and play back not only still images but also motion images.

In this case, still image data and motion image data obtained by photographing are stored in the memory card 69, and the contents stored in the memory card 69 can be arbitrarily played back on the main display 45 in accordance with a selection instruction in the playback mode. Also, the contents can be transmitted to a communication partner by properly selecting and setting them as an attached file of e-mail.

The operation of the fourth embodiment will be explained.

Note that both the set key 46b and shutter key 46c of the various keys 46 immediately execute photographing by one stroke operation.

The following processes are basically executed by the controller 65 on the basis of a permanently stored program.

Figure 11:
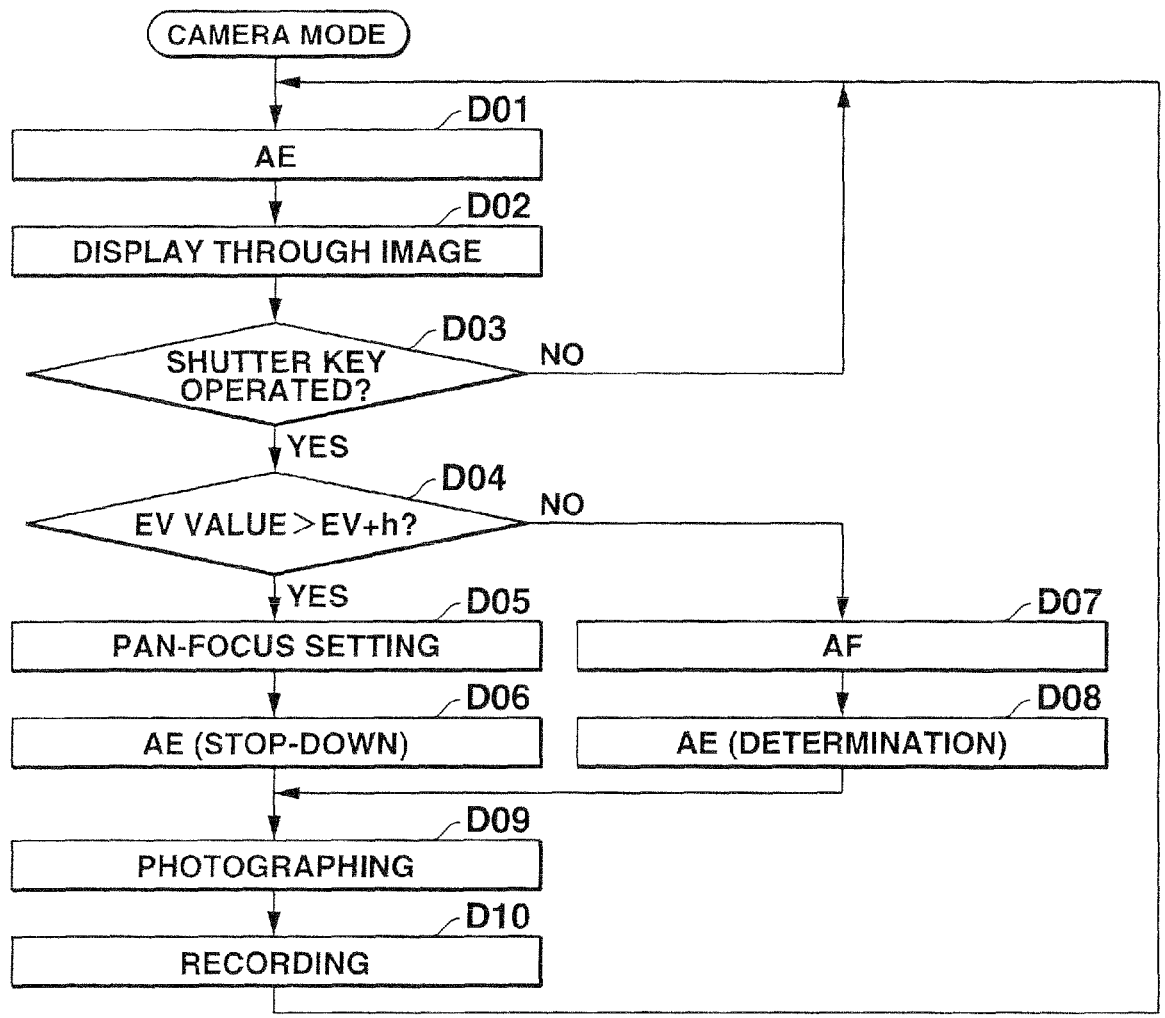
FIG. 11 is a flowchart showing the process contents of a camera mode according to the fourth embodiment.

FIG. 11 shows process contents in still image photographing when the camera mode is set by operating the camera key 46a of the various keys 46. An AE process is first executed at a focal length corresponding to the currently selected zoom position of the camera 48 (step D01). A correct exposure value is obtained to set an F-number and shutter speed, and an image is obtained from the CCD 75 on the basis of the F-number and shutter speed. While a through image is displayed on the main display 45 or sub-display 50 (step D02), whether the set key 46b or shutter key 46c of the various keys 46 is pressed is determined (step D03). This determination is repetitively executed, and the flow waits until the set key 46b or shutter key 46c is operated.

If the set key 46b or shutter key 46c is operated, this operation is determined in step D03. Whether the current correct exposure value has a sufficient luminance is determined from whether the correct exposure value (EV value) acquired in the AE process of immediately preceding step D01 is larger than a preset exposure threshold (EVth) (step D04).

If it is determined that the correct exposure value is larger than the preset exposure threshold and has a sufficient luminance, a predetermined in-focus position which corresponds to the current zoom position of the camera 48 and provides the depth of field as large as possible is so fixed and set as to set a state close to the pan-focus, (step D0S). In addition, a so-called stop-down AE process of setting the F-number as large as possible from the correct exposure value obtained in immediately preceding step D01 and decreasing the shutter speed in correspondence with the F-number is executed (step D06). The cellular phone 40 then shifts to the image data recording/save state.

More specifically, after image data by image sensing is obtained (step D09), the image data obtained by photographing is recorded and saved as a file in the memory card 69 by the image processing unit 68 (step D10). A series of photographing processes end, and the flow returns to the process from step D01 again in order to prepare for the next photographing.

If it is determined in step D04 that the correct exposure value is equal to or smaller than the preset exposure threshold and does not have any sufficient luminance, an AF process is performed to obtain an in-focus position so as to focus the lens to a predetermined focus area because stop-down for obtaining the pan-focus results in a dark image (step D07). At the same time, the F-number and shutter speed which have been acquired in the AE process of immediately preceding step D01 and provide correct exposure are determined (step D08). Thereafter, the cellular phone 40 shifts to the image data recording/save state.

More specifically, after image data by image sensing is obtained (step D09), the image data obtained by image sensing is recorded and saved as a file in the memory card 69 by the image processing unit 68 (step D10). A series of photographing processes end, and the flow returns to the process from step D01 again in order to prepare for the next photographing.

In this case, it is displayed by, e.g., a character string "AF" or "autofocus" at the center of the screen of the main display 45 or sub-display 50 that an image has been taken and recorded by the AF process. The user can be notified that photographing was to be executed at the pan-focus but was executed at the autofocus.

As described above, when the F-number is set large for a fixed focus upon determining in the AE process that an image has a low brightness, a decrease in light quantity cannot be satisfactorily compensated for even by decreasing the shutter speed, resulting in a dark image. To avoid a photographing failure, the AF process using correct exposure is preferentially executed.

Fifth Embodiment

The fifth embodiment in which the present invention is applied to a CDMA cellular phone with a camera function will be described with reference to the several views of the accompanying drawing.

The outer appearance is basically the same as that in FIGS. 9A and 9B, and the electronic circuit configuration is basically the same as that in FIG. 10. The same numerals denote the same parts, and an illustration and description thereof will be omitted.

The operation of the fifth embodiment will be explained.

Note that both a set key 46b and shutter key 46c of various keys 46 immediately execute photographing by stroke operation of one stroke.

The following processes are basically executed by a controller 65 on the basis of a permanently stored program.

Figure 12:
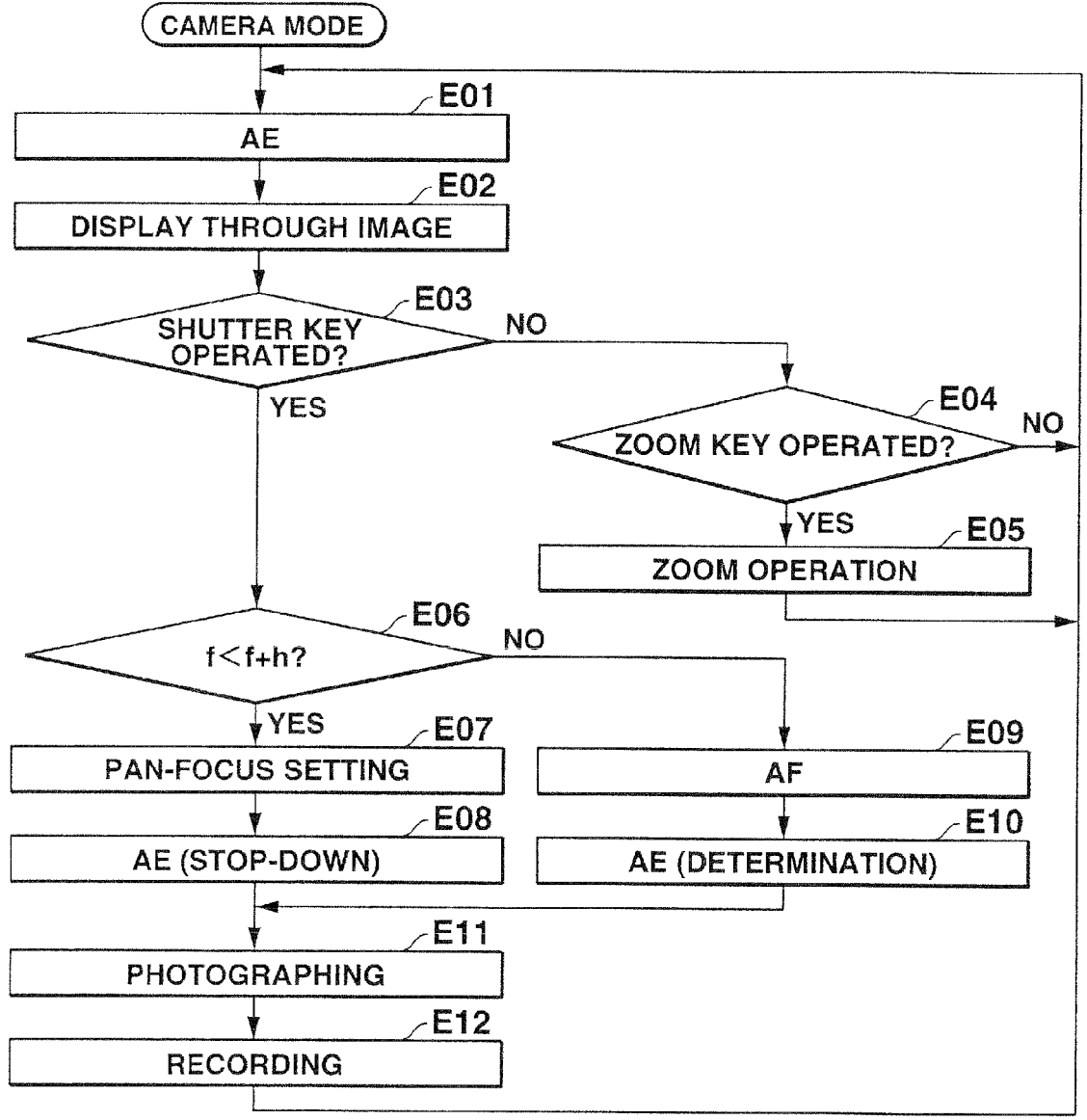
FIG. 12 is a flowchart showing the process contents of the camera mode in a cellular phone according to the fifth embodiment of the present invention.

FIG. 12 shows process contents in still image photographing when the camera mode is set by operating a camera key 46a of the various keys 46. An AZ process is first executed at a focal length corresponding to the currently selected zoom position of a camera 48 (step E01). A correct exposure value is obtained to set an F-number and shutter speed, and an image is obtained from a CCD 75 on the basis of the F-number and shutter speed. While a through image is displayed on a main display 45 or sub-display 50 (step E02), whether the set key 46b or shutter key 46c of the various keys 46 is pressed (step E03), and whether movement of the zoom position by an optical lens system 74 is designated with the "Δ" key or "∇" key of a ring key 46d of the various keys 46 (step E04) are sequentially determined. This determination is repetitively executed, and the flow waits until the set key 46b or shutter key 46c is operated or the "Δ" key or "∇" key of the ring key 46d is operated.

If the "Δ" key or "∇" key of the ring key 46d is operated, this operation is determined in step E04.

A motor 73 drives the optical lens system 74 to execute zoom-up or zoom-down in accordance with the operation contents (step E05), and the flow returns to the process from step E01 again.

If the set key 46b or shutter key 46c is operated, this operation is determined in step E03. Whether the pan-focus effect can be obtained in terms of the depth of field is determined from whether a focal length (f) corresponding to the current zoom position is smaller than a preset focal length threshold (fth) (step E06).

If it is determined that the current focal length is smaller than the preset focal length threshold and the depth of field can be set satisfactorily large to obtain almost the pan-focus effect, a predetermined in-focus position which corresponds to the current zoom position of the camera 48 and provides the depth of field as large as possible is so fixed and set as to set a state close to the pan-focus, (step E07) In addition, a so-called stop-down AE process of setting the F-number as large as possible from the correct exposure value obtained in immediately preceding step E01 and decreasing the shutter speed in correspondence with the F-number is executed (step E08). The cellular phone 40 then shifts to the image data recording/save state.

More specifically, after image data by image sensing is obtained (step E11), the image data obtained by photographing is recorded and saved as a file in a memory card 69 by an image processing unit 68 (step E12). A series of photographing processes end, and the flow returns to the process from step E01 again in order to prepare for the next photographing.

If it is determined in step E06 that the current focal length is equal to or larger than the preset focal length threshold and no pan-focus effect can be obtained by setting a large depth of field, an AF process is performed to obtain an in-focus position so as to focus the lens to a predetermined focus area (step E09). At the same time, the F-number and shutter speed which have been acquired in the AE process of immediately preceding step E01 and provide correct exposure are determined (step E10). The cellular phone 40 then shifts to the image data recording/save state.

More specifically, after image data by image sensing is obtained (step Eli), the image data obtained by photographing is recorded and saved as a file in the memory card 69 by the image processing unit 68 (step E12). A series of photographing processes end, and the flow returns to the process from step E01 again in order to prepare for the next photographing.

In this case, it is displayed by, e.g., a character string "AF" or "autofocus" at the center of the screen of the main display 45 or sub-display 50 that an image has been taken and recorded by the AF process. The user can be notified that photographing was to be executed at the pan-focus but was executed at the autofocus.

As described above, when it is determined that the focal length is large and the focus is set on the telephoto side, the depth of field becomes small even by exposure stop-down, and the pan-focus effect is hardly attained. Thus, a photographing failure can be avoided by giving priority to the autofocus.

Sixth Embodiment

The sixth embodiment in which the present invention is applied to a CDMA cellular phone with a camera function will be described with reference to the several views of the accompanying drawing.

The outer appearance is basically the same as that in FIGS. 9A and 9B, and the electronic circuit configuration is basically the same as that in FIG. 10. The same numerals denote the same parts, and an illustration and description thereof will be omitted.

The operation of the sixth embodiment will be explained.

Note that both a set key 46b and shutter key 46c of various keys 46 immediately execute photographing by one stroke operation.

The following processes are basically executed by a controller 65 on the basis of a permanently stored program.

Figure 13:
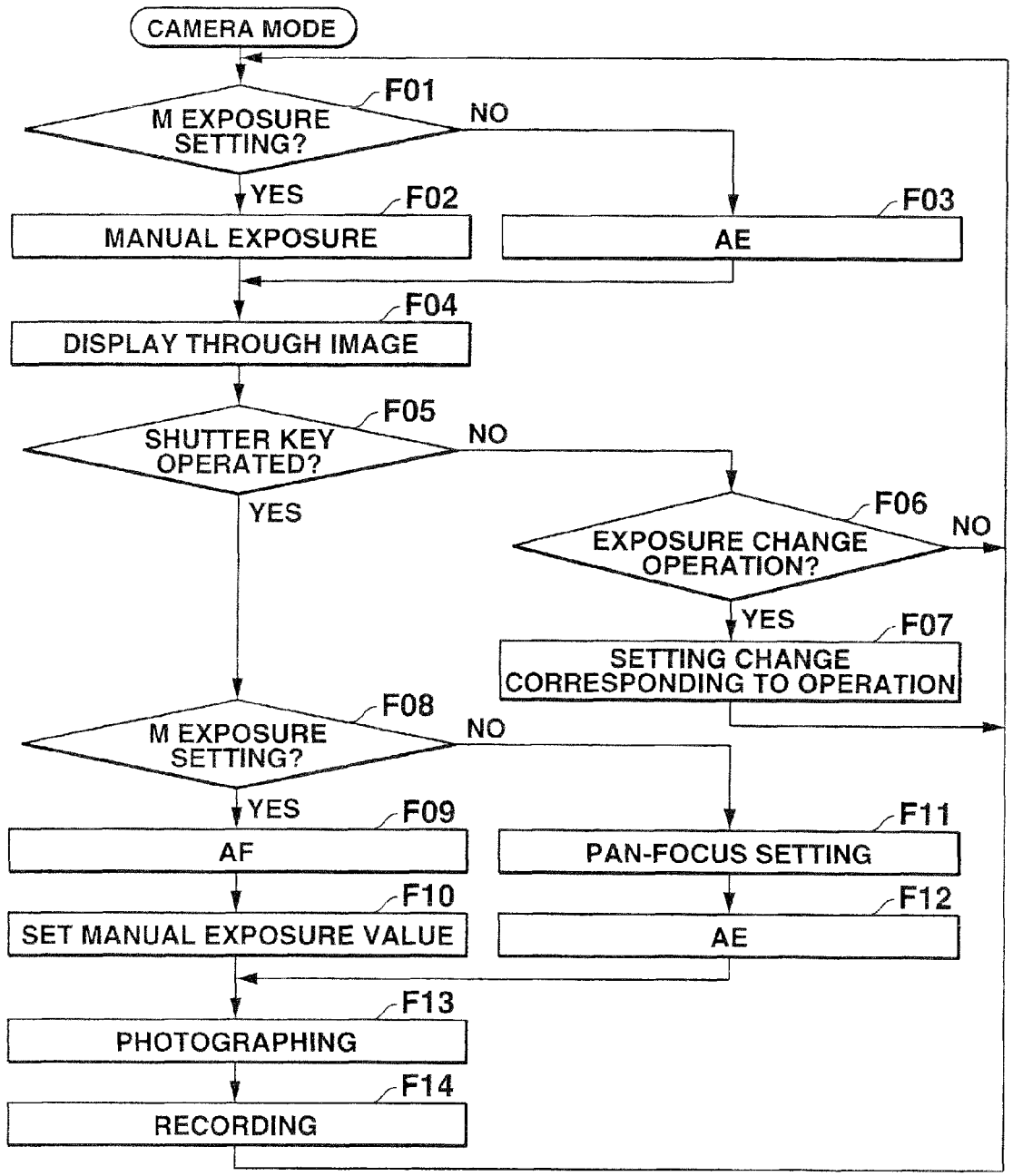
FIG. 13 is a flowchart showing the process contents of the camera mode in a cellular phone according to the sixth embodiment of the present invention.

FIG. 13 shows process contents in still image photographing when the camera mode is set by operating a camera key 46a of the various keys 46. Whether a manual exposure mode has been set by user's mode setting is determined (step F01). If the manual exposure mode is set, an exposure value corresponding to manual operation by the user with a ring key 46d of the various keys 46 is set (step F02). If no manual exposure mode is set, an AE process is executed at a focal length corresponding to the currently selected zoom position of a camera 48 (step F03).

An image is obtained from a CCD 75 on the basis of the F-number and shutter speed corresponding to the exposure state. While a through image is displayed on a main display 45 or sub-display 50 (step F04), whether the set key 46b or shutter key 46c of the various keys 46 is pressed (step F05), and whether setting change operation associated with exposure is done (step F06) are sequentially determined. This determination is repetitively executed, and the flow waits until the set key 46b or shutter key 46c is operated or exposure change setting operation is done.

If exposure change setting operation is done, this operation is determined in step F06. An exposure setting change which includes a process of changing the exposure mode to AE or manual exposure and corresponds to operation contents is properly executed (step F07), and the flow returns to the process from step F01 again.

If the set key 46b or shutter key 46c is operated, this operation is determined in step F05. Whether the manual exposure mode is set by user's mode setting is determined (step F08).

If it is determined that no manual exposure mode is set and the AE process has been executed in immediately preceding step F03, a predetermined in-focus position which corresponds to the current zoom position of the camera 48 and provides the depth of field as large as possible is so fixed and set as to set a state close to the pan-focus, (step F11). In addition, a so-called stop-down AE process of setting the F-number as large as possible from the correct exposure value obtained in immediately preceding step F03 and decreasing the shutter speed in correspondence with the F-number is executed (step F12). The cellular phone 40 then shifts to the image data recording/save state.

More specifically, after image data by image sensing is obtained (step F13), the image data obtained by photographing is recorded and saved as a file in a memory card 69 by an image processing unit 68 (step F14). A series of photographing processes end, and the flow returns to the process from step F01 again in order to prepare for the next photographing.

If it is determined in step F08 that the manual exposure mode is set and the user has arbitrarily set exposure conditions, an AF process is performed to obtain an in-focus position so as to focus the lens to a predetermined focus area because stop-down operation performed to obtain the pan-focus effect changes the exposure conditions set by the user (step F09). At the same time, the F-number and shutter speed which have been set by the manual exposure process in immediately preceding step F02 are determined (step F10). The cellular phone 40 then shifts to the image data recording/save state.

More specifically, after image data by image sensing is obtained (step F13), the image data obtained by photographing is recorded and saved as a file in the memory card 69 by the image processing unit 68 (step F14). A series of photographing processes end, and the flow returns to the process from step F01 again in order to prepare for the next photographing.

In this case, it is displayed by, e.g., a character string "AF" or "autofocus" at the center of the screen of the main display 45 or sub-display 50 that an image has been taken and recorded by the AF process. The user can be notified that photographing was to be executed at the pan-focus but was executed at the autofocus.

As described above, when the user sets manual exposure, the exposure value set by the user may change by setting a large F-number in order to obtain the pan-focus effect. To prevent this, the autofocus process is preferentially executed instead of the fixed focus without changing user's photographing purpose.

In the first to third embodiments, the present invention is applied to a digital still camera. In the fourth to sixth embodiments, the present invention is applied to a CDMA cellular phone with a camera function. However, the present invention is not limited to them, and can also be applied to a PDA (Personal Digital Assistants) with a camera function, a mobile computer, a video movie camera capable of still image photographing, and a (still) camera using a silver halide film.

The first to third embodiments can also be applied to a CDMA cellular phone with a camera function, and the fourth to sixth embodiments can also be applied to a digital camera.

For example, the set key 46b or shutter key 46c of a CDMA cellular phone with a camera function is designed to operate by two stroke operations. When the camera mode is set, "half stroke" and "full stroke" are determined, similar to the digital camera. With this setting, the first to third embodiments can be applied to the CDMA cellular phone with the camera function.

Also, determination (steps D03, E03, and F05) of shutter key operation of the CDMA cellular phone with the camera function is replaced with determination of a full stroke of the shutter key of a digital camera. With this setting, the fourth to sixth embodiments can be applied to the digital camera.

The first to third embodiments adopt two, near-view and distant-view fixed-focus ranges, and which of the ranges is set is determined. The fourth to sixth embodiments may similarly adopt a plurality of fixed-focus ranges, and the determination method is not particularly limited.

The present invention is not limited to the above embodiments, and can be variously modified and practiced without departing from the spirit and scope of the invention.

The embodiments include inventions on various stages, and various inventions can be extracted by an appropriate combination of building components disclosed. For example, even when several building components are omitted from all those described in the embodiments, an arrangement obtained by omitting these building components is extracted as an invention as far as at least one of problems described in "Background Art" can be solved and at least one of the effects described in "Disclosure of Invention" can be obtained.

What is claimed is:

1. An image sensing apparatus comprising:
a photographing unit which has an autofocus function and photographs an object image;

an autoexposure unit which automatically sets a correct exposure value in the photographing unit;

a manual exposure unit for manually setting an arbitrary exposure value instead of the correct exposure value automatically set by the autoexposure unit;

a detection unit which detects whether or not a manual exposure mode for manually setting an arbitrary exposure value by the manual exposure unit is set;

an instruction unit which instructs photographing by the photographing unit; and a focus control unit which, in a case in which the detection unit detects the manual exposure mode to be set when photographing is instructed by the instruction unit, controls the autofocus function of the photographing unit to be operated, and in a case in which the detection unit does not detect the manual exposure mode to be set, sets a focus position of the photographing unit to a fixed-focus position, and controls the autoexposure unit to automatically set an exposure value in which a predetermined depth of field can be obtained in the fixed-focus position.

2. The image sensing apparatus according to claim 1, further comprising a focus range determination unit which determines a fixed-focus range containing the object image from a plurality of fixed-focus ranges;

wherein the focus control unit selects the fixed-focus range obtained by the focus range determination unit when setting the focus position of the photographing unit to the fixed-focus position.

3. The image sensing apparatus according to claim 2, wherein the photographing unit has an auto white balance function of performing color temperature adjustment corresponding to a light source; and wherein the focus range determination unit determines the fixed-focus range containing the object image in accordance with a result of color temperature adjustment by the auto white balance function.

4. The image sensing apparatus according to claim 2, further comprising a notification unit which issues a notification of a result of the determining of the fixed-focus range containing the object image by the focus range determination unit.

5. The image sensing apparatus according to claim 3, further comprising a notification unit which issues a notification of a result of the determining of the fixed-focus range containing the object image by the focus range determination unit.

6. A non-transitory computer readable recording medium having a program stored thereon for controlling a computer of an image sensing apparatus having an autofocus function, an autoexposure function, and a manual exposure function for manually setting an arbitrary exposure value instead of an exposure value obtained by the autoexposure function, the program being executable to control the computer to perform functions comprising:

detecting whether or not a manual exposure mode for manually setting an arbitrary exposure value by the manual exposure function is set; and in a case in which the manual exposure mode is detected to be set when photographing is instructed, controlling the autofocus function to be operated, and in a case in which the manual exposure mode is not detected to be set, setting a focus position to a fixed-focus position, and controlling the autoexposure function to automatically set an exposure value in which a predetermined depth of field can be obtained in the fixed-focus position.

7. The recording medium according to claim 6, wherein the functions further comprise:

determining a fixed-focus range containing an object image from a plurality of fixed-focus ranges;

wherein the determined fixed-focus range is selected when setting the focus position to the fixed-focus position.

\* \* \* \* \*